United States Patent [19]

Brandsma et al.

[11] 3,751,645

[45] Aug. 7, 1973

[54] METHOD OF AND DEVICE FOR THE DIGITAL SIMULATION OF DIGITAL COMPUTER CONFIGURATIONS

[75] Inventors: Johan Rudolf Brandsma; Jacob Fredrik Klinkhamer; Benny Louisa Angelina Waumans, all of Emmasingel, Eindhoven, Netherlands

[73] Assignee: U.S. Philips Corporation, New York, N.Y.

[22] Filed: Sept. 2, 1971

[21] Appl. No.: 177,391

[30] Foreign Application Priority Data

Sept. 3, 1970 Netherlands ........................ 7013032

[52] U.S. Cl. .................................... 235/152, 444/1

[51] Int. Cl. .................................................... G06f

[58] Field of Search ............................ 235/152, 184

[56] References Cited

UNITED STATES PATENTS 3,443,078 5/1969 Noronha et al. ................ 235/184 X

OTHER PUBLICATIONS

Norman R. Nielsen, "Computer Simulation of Computer System Performance" Proceeding A.C.M. National Meeting, 1967 pp. 581–590.

*Primary Examiner*—Eugene G. Botz
*Assistant Examiner*—David H. Malzahn
*Attorney*—Frank R. Trifari

[57] ABSTRACT

A method of, and device for, the digital simulation of digital computer configurations, in which the various computer modules of a computer configuration to be simulated, are replaced by hardware digital simulation modules which can be placed on a panel, and which are connected in accordance with the configuration. During the simulation, the actual speeds of the simulated computer modules are represented by adjustable clock pulse signals which are applied to the simulation modules. Display modules signal the conditions occurring in and on the outputs of the simulation modules.

2 Claims, 27 Drawing Figures

Patented Aug. 7, 1973 3,751,645

15 Sheets-Sheet 1

INVENTORS
JOHAN R. BRANDSMA
JACOB F. KLINKHAMER
BENNY L. A. WAUMANS
BY
AGENT

INVENTORS
JOHAN R. BRANDSMA
JACOB F. KLINKHAMER
BENNY L.A. WAUMANS
BY
AGENT

INVENTORS
JOHAN R. BRANDSMA
JACOB F. KLINKHAMER
BENNY L.A. WAUMANS
BY
AGENT

INVENTORS
JOHAN R. BRANDSMA
JACOB F. KLINKHAMER
BENNY L.A. WAUMANS
BY
[signature]
AGENT

INVENTORS
JOHAN R. BRANDSMA
JACOB F. KLINKHAMER
BENNY L. A. WAUMANS
BY
AGENT

INVENTORS
JOHAN R. BRANDSMA
JACOB F. KLINKHAMER
BENNY L. A. WAUMANS
BY

AGENT

INVENTORS
JOHAN R. BRANDSMA
JACOB F. KLINKHAMER
BENNY L. A. WAUMANS
BY

AGENT

INVENTORS
JOHAN R. BRANDSMA
JACOB F. KLINKHAMER
BENNY L.A. WAUMANS
BY
AGENT

INVENTORS
JOHAN R. BRANDSMA
JACOB F. KLINKHAMER
BENNY L.A. WAUMANS
BY
[signature]
AGENT

INVENTORS
JOHAN R. BRANDSMA
JACOB F. KLINKHAMER
BENNY L.A. WAUMANS
BY

AGENT

INVENTORS
JOHAN R. BRANDSMA
JACOB F. KLINKHAMER
BENNY L.A. WAUMANS
BY
AGENT

INVENTORS
JOHAN R. BRANDSMA
JACOB F. KLINKHAMER
BENNY L.A. WAUMANS
BY
[signature]
AGENT

INVENTORS
JOHAN R. BRANDSMA
JACOB F. KLINKHAMER
BENNY L.A. WAUMANS
BY

AGENT

INVENTORS
JOHAN R. BRANDSMA
JACOB F. KLINKHAMER
BENNY L.A. WAUMANS
BY

AGENT

INVENTORS
JOHAN R. BRANDSMA
JACOB F. KLINKHAMER
BENNY L.A. WAUMANS
BY
[signature]
AGENT

METHOD OF AND DEVICE FOR THE DIGITAL SIMULATION OF DIGITAL COMPUTER CONFIGURATIONS

The invention relates to a method of and a device for the digital simulation of digital computer configurations. In the development of a computer system, simulations are often used to enable, in advance, the study and prediction of the behavior of a configuration to be built. So far these simulations are performed by means of programmes specially developed and written for this purpose on already existing computer configurations. In general, these simulations are expensive, inter alia, due to the fact that each modification of one of the parameters of a system to be simulated necessitates a new simulation run.

The invention has for its object to simplify the simulation for digital computer configurations, and to create in particular, the possibility of saving costs and time in elaborating and trying a simulation, by minimizing the consequences of the modification of one or more parameters in the system. To this end, the method of the digital simulation of digital computer configurations, according to the invention, is characterized in that the various computer modules of a computer configuration to be simulated, are replaced by hardware digital simulation modules performing the functions of those computer modules. Starting conditions are introduced in designated simulation modules during a presetting phase, before the start of a simulation run, the actual speeds of the simulated computer modules being simulated by variable clock pulse signals applied to the simulation modules during simulation. The events taking place in the various simulation modules are signalled on display modules.

A digital simulator for carrying out the method, is characterized in that there is provided a panel in which digital simulation modules can be placed, representing the various computer modules, and being mutually connectable in accordance with the configuration to be simulated. In addition there is provided a power supply unit for the power supply of the simulation modules, a presetting unit for presetting simulation modules, a clock unit by means of which the actual speeds of the computer modules to be simulated in the simulation modules can be adjusted, and display units for signalling the conditions occurring in, and on the outputs of, the simulation modules.

The simulation of a computer module according to this digital method of simulation, is to some extent comparable to the solution of problems on an analogue computer. Use is made of a panel on which various more or less standard digital simulation modules are provided. One or more of these simulation modules represent the configuration modules such as the central processor, the processing store, a disc store etc. However, significant differences exist between simulations performed on an analogue computer, and the simulations according to the invention which are based on the fact that all activities are performed in a digital manner. For example, a transport of information is not a continuous signal but a pulse signal, and a coefficient is not a potentiometer setting, but a clock pulse signal having a given pulse frequency. For simulating digital computer configurations, a digital simulation system has the advantage that the simulation of flows of information, the storage thereof, and transport limitations, can thus be readily realized in a digital manner. Time-consuming adjustments and readjustments are superfluous, and the speed of a digital simulation can be readily varied by varying a master clock pulse frequency from which all clock pulse signals required for the digital simulation are derived.

In order to achieve a flexible simulation configuration, it is advantageous to have a number of deliberately chosen standard hardware simulation modules available. According to a further detailing of the invention, the following is an advantageous choice for these standard simulation modules in practice: a digital channel simulator for simulating information transport limitations between computer modules to be simulated, speed limitations of stores, of peripheral equipment and processors, a fixed and random delay, and the multiplication of pulse repetition frequencies; digital buffer simulation modules for simulating hardware buffers of computer modules to be simulated, of stores having given capacities, the division of pulse repetition frequencies; priority modules for representing mutual priorities of computer modules to be simulated, and for the summation of a pulse series occurring during simulation;

counter-decoding modules for counting pulses and for decoding counter positions, randomizer modules for pseudo-random generation of O-signals and 1-signals, display modules for displaying conditions in and on outputs of simulation modules.

Some of the above-mentioned standard simulation modules may be combined again to form a so-called standard simulation sub-module.

In many cases, given configurations of standard simulation modules exist which can be used, for example, the combination of a channel simulator and a buffer simulator constitutes a card reader.

A specific average speed of information in a simulation module, for example, a card reader, is simulated by means of a clock pulse signal derived from a master clock, the frequency of which is related directly to the (card reader) average speed. The upper limit of the frequencies to be used is governed by the condition that no delay errors and detrimental capacities and/or inductive couplings are allowed to occur in the conductors used. The lower limit is governed by the condition that a simulation run is to be completed within a reasonable period of time. If a configuration comprising a card reader having a speed of 25 cards/s and a read-only store having a cycle time of 100 ns is simulated, it must be possible to realize a speed difference of 1 : $4.10^5$ in the simulation process. If the clock unit comprises a master clock having a pulse repetition frequency of 1 MHz, the minimum time required for reading, for example, 100 cards is 40 s.

The results of a simulation according to the invention are indicated by alarm modules which light up when an average limitation of a module is exceeded. The master clock can be stopped at the same instant. The cause of this alarm can be found with the aid of buffer simulator contents and counter contents. Furthermore, display modules can be used which are capable of displaying, for example, the actual contents of buffer simulators and counters. A percentage counter may be connected to a channel simulator so as to permit determination of the relative degree of occupation of a channel. Time counters may be used to establish the duration of given portions of a complete simulation run.

In practice, it is also useful to have one or more units available in which a group of free gates or set-reset flipflops are provided. These gates and flipflops can be used anywhere in a simulation where they are required in view of the configuration.

In order that the invention may be readily carried into effect, some embodiments thereof will now be described in detail, by way of example, with reference to the accompanying diagrammatic drawings, in which.

Figure 19:
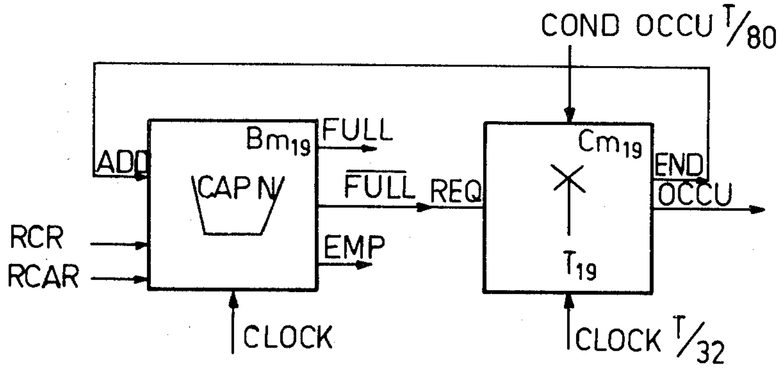
Figure 20:
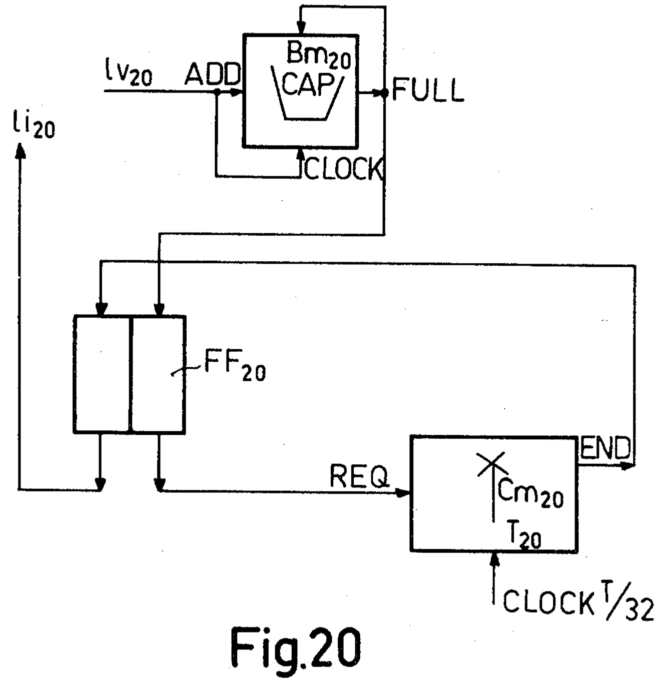
Figure 21:
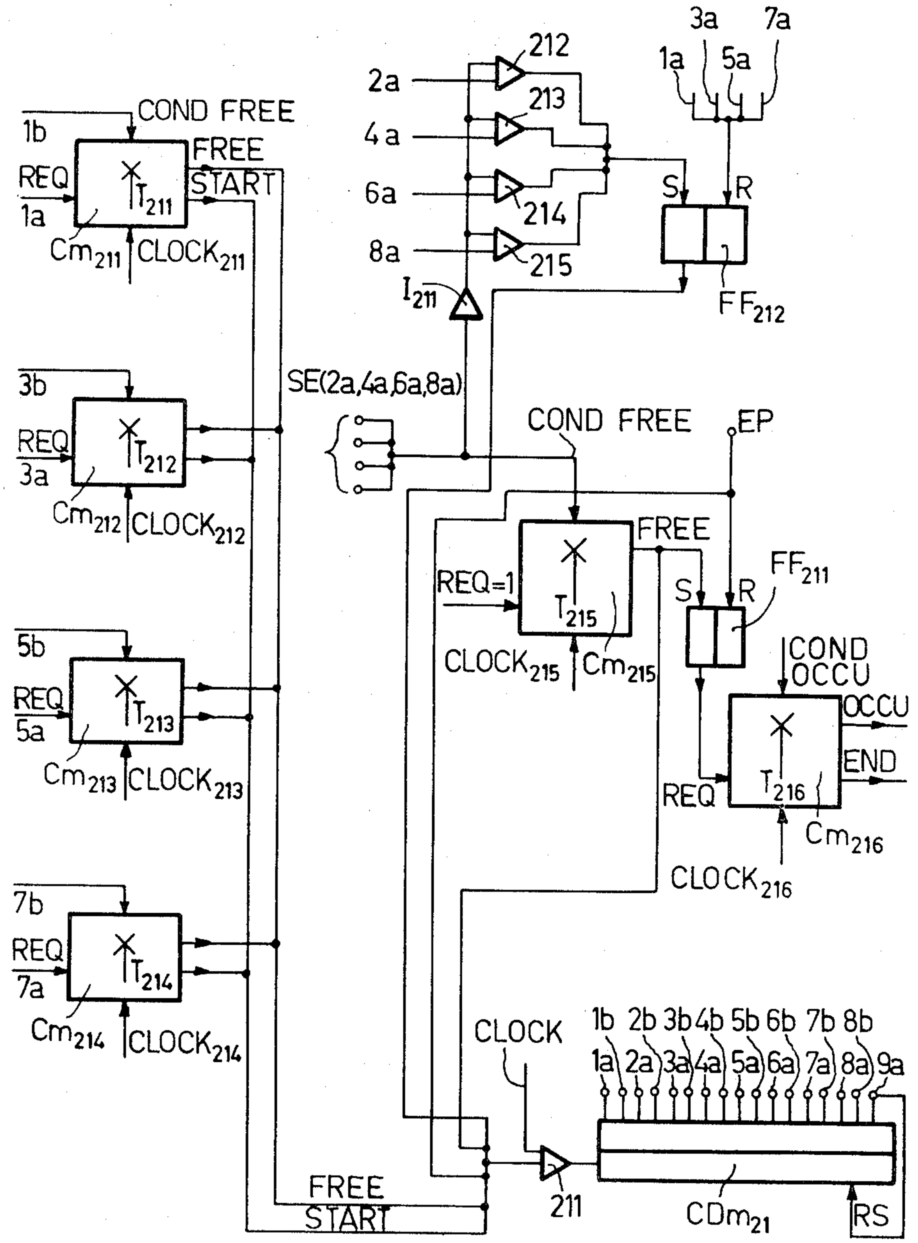
Figure 22:
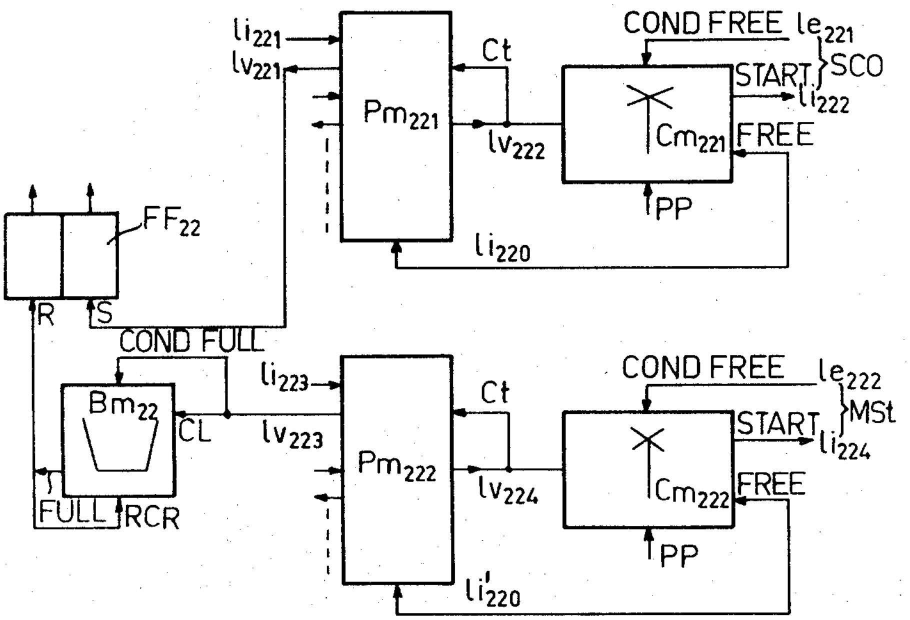
Figures 23, 24:
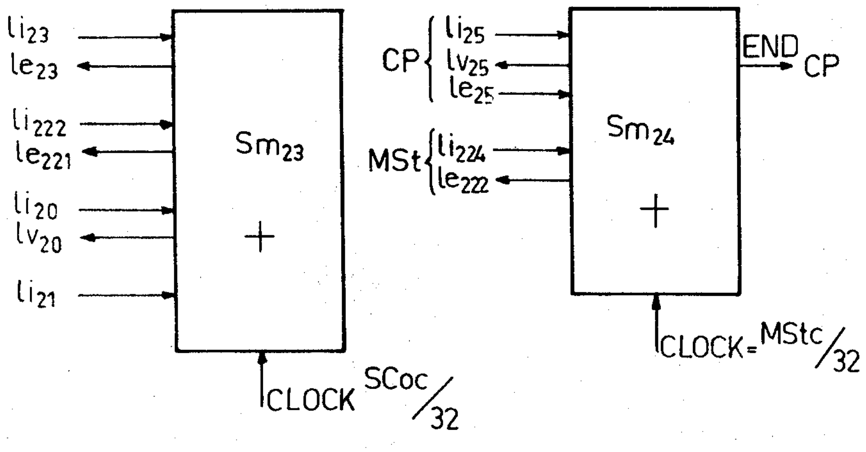
Figure 25:
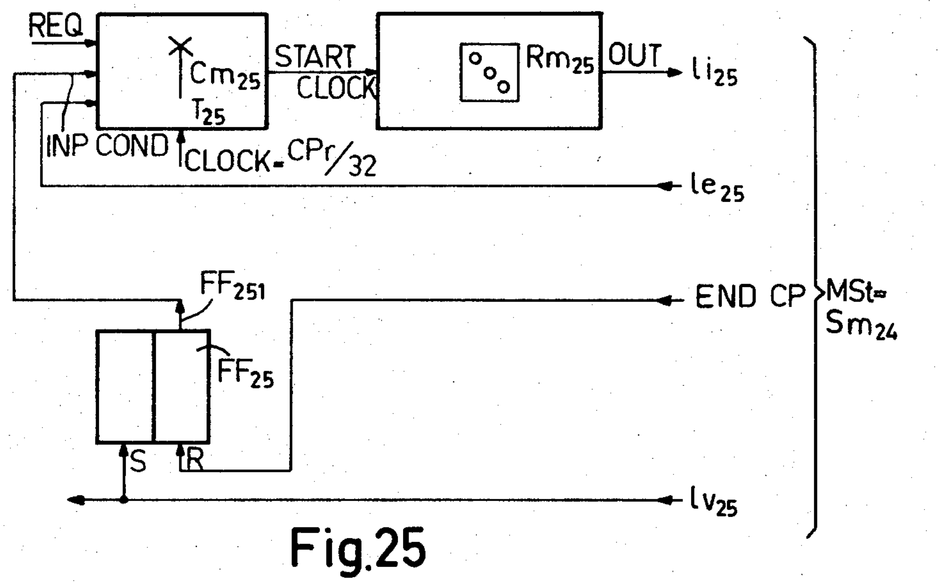
Figure 26:
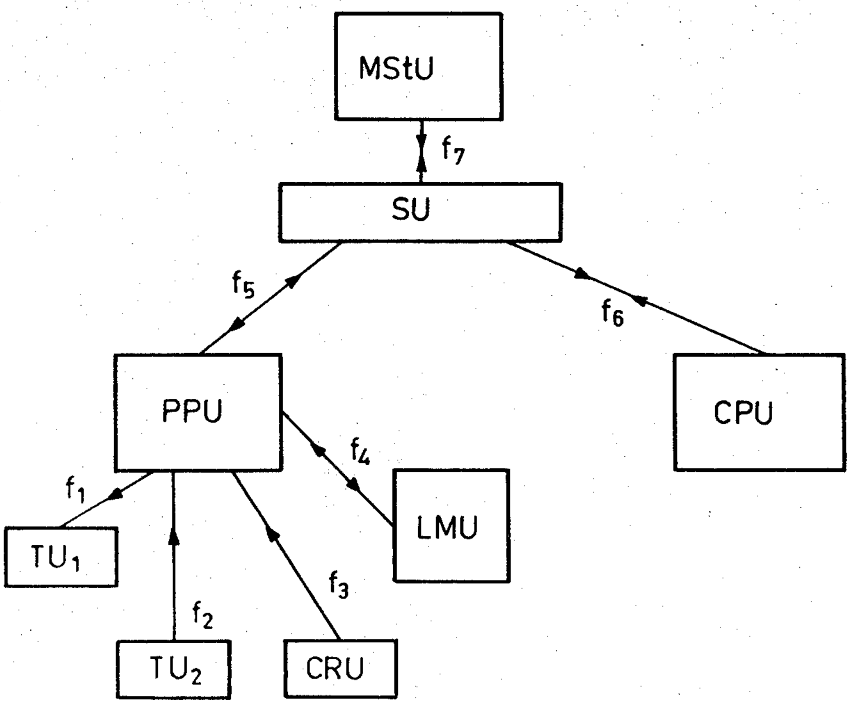
Figure 27:
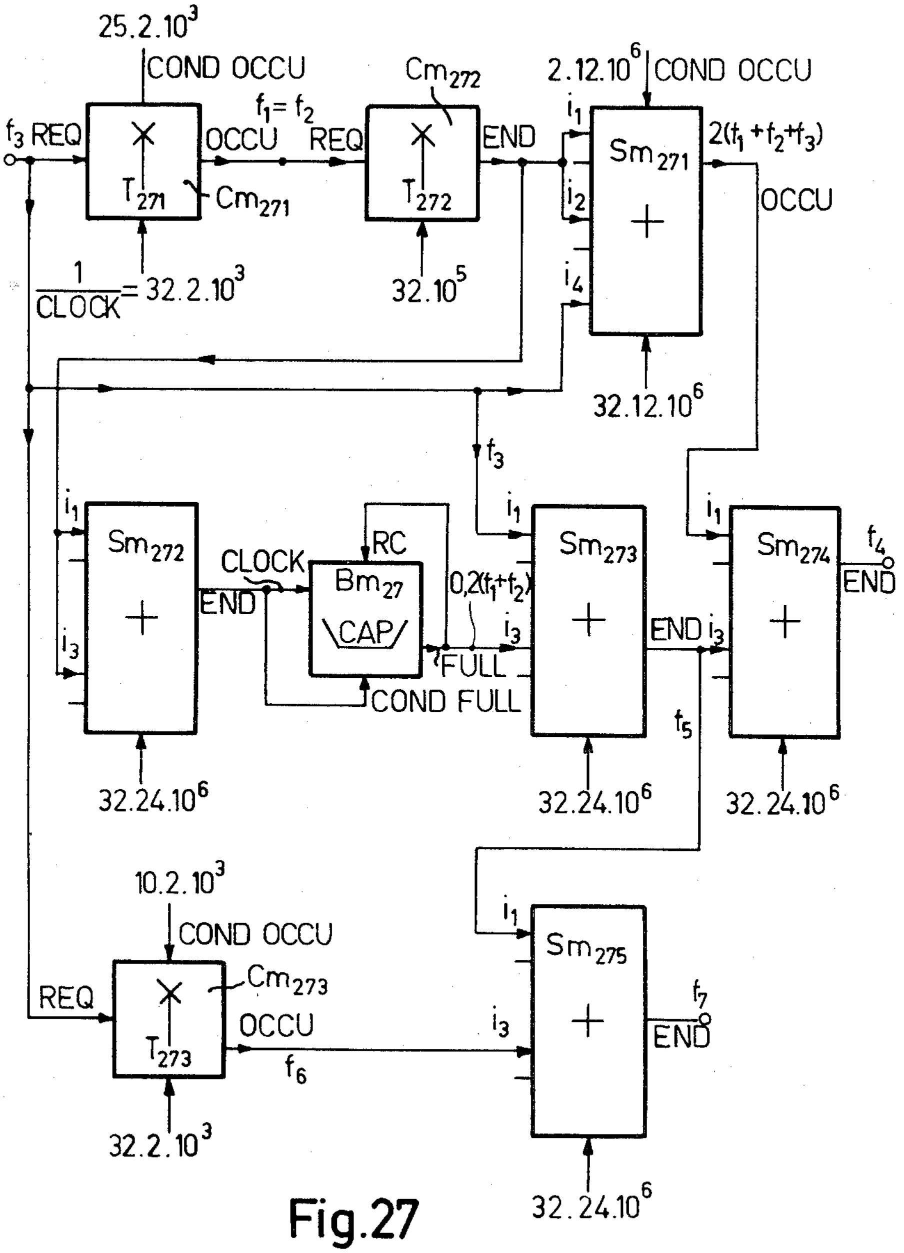

FIG. 19: simulation of a card reader;

FIG. 20: simulation of a tape unit or line printer;

FIG. 21: simulation for a disc store;

FIG. 22: simulation of a move facility;

FIG. 23: simulation of a slow store;

FIG. 24: simulation of a main store;

FIG. 25: simulation of a central processor:

FIG. 26: example of a continuous flow configuration;

FIG. 27: simulation for the configuration shown in FIG. 26.

Figure 1:
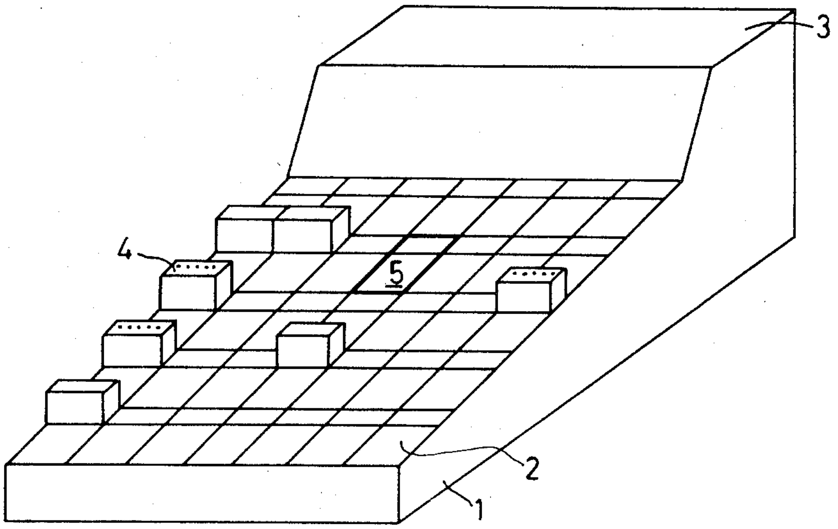
FIG. 1 shows a first embodiment of a digital simulator for carrying out the method according to the invention.
Figure 2:
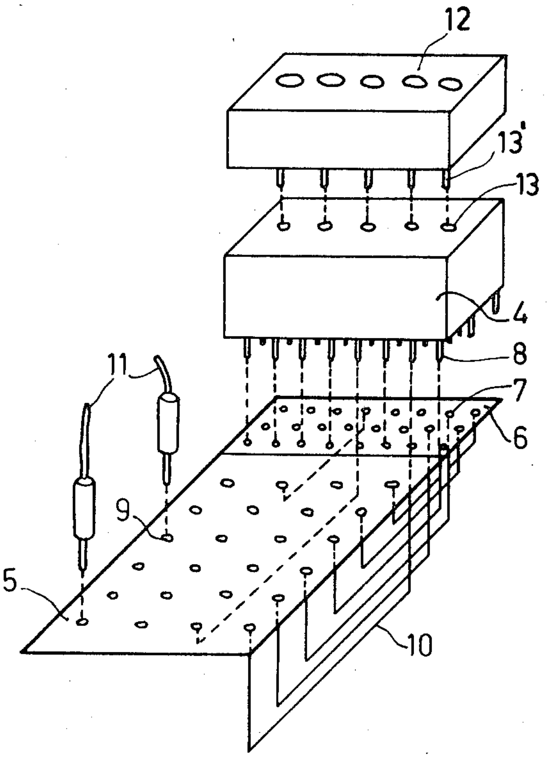
FIG. 2 shows a module arrangement of the digital simulator shown in FIG. 1.

Referring now to FIG. 1 an embodiment of a digital simulator according to the invention, is shown by means of which the method according to the invention can be carried out. Reference numeral 1 denotes the simulator housing which comprises a panel 2 and a compartment 3. The panel 2 can be provided with simulation modules 4 in accordance with a computer configuration to be simulated. In this case, the compartment 3 comprises a clock unit not shown, a presetting unit, and a power supply unit. FIG. 2 shows a detail of FIG. 1: reference numeral 5 denotes the sector on the panel 2 which is allocated to each simulation module 4. Reference numeral 6 denotes a portion in which the output pins 8 of a simulation module 4, provided in fixed places on the module 4, fit in holes 7. A portion 9 of panel sector 5 has conductors 10 to the holes 7 such that the portion 9 enables any desired connection to be established, for example, by means of plug connections 11, or with other modules, with the power supply unit, the presetting unit and the clock unit. If a display module 12 is used for a simulation module 4, it can be provided in holes 13 on the upper side of this simulation module by means of pins 13'. The pins 13' provide the contact between the relevant simulation module outputs and the display module inputs. The number of holes 7 which is to be present in each panel portion 6, is equal to the maximum number of outputs of a standard simulation module. If a module itself has fewer outputs, a number of the holes 7 remain unused.

Figures 3, 4:
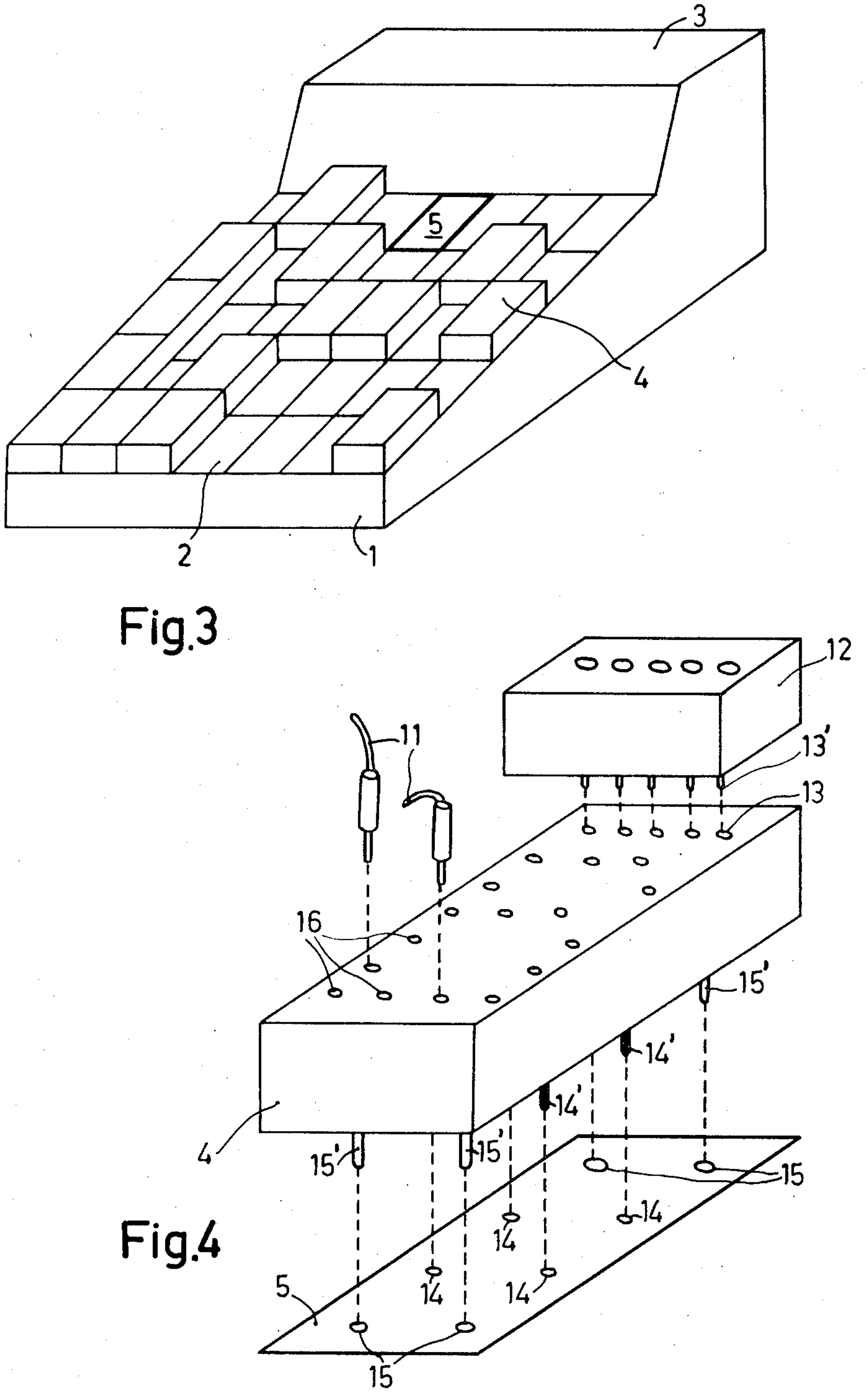
FIG. 3 shows a second embodiment of a digital simulator.
FIG. 4 shows a module arrangement of the digital simulator shown in FIG. 3.

FIG. 3 shows a slightly modified embodiment of a digital simulator according to the invention. Reference numeral 1 again denotes the housing, reference numeral 2 again denotes the panel, reference numeral 3 again denotes the compartment in which the clock unit etc. is accommodated. The simulation modules are again denoted by reference numeral 4. FIG. 3 shows that a sector 5 on the panel 2 is completely occupied by a module 4 if the latter is placed thereon. The detail shown in FIG. 4 depicts this possibility since in this case, a sector 5 serves only for power supply of a simulation module. Holes 14 are provided in which the power supply input pins 14' of the module 4 engage. Fixation holes 15 with pins 15', may also be provided. For establishing the connections with other simulation modules, a presetting unit and the clock unit, the simulation module is in this case provided with outputs in the form of holes 16 in its upper side. In these holes, the connection conductors provided with the plugs 11 can be inserted. As is shown in FIG. 2, a display module 12 can again be inserted in holes 13 of a simulation module 4 by means of pins 13', thus establishing the desired connections between both.

Hereinafter, the clock unit, the presetting unit, the various standard simulation modules and the display modules to be used for simulating will be described in detail for proper understanding of the inveniton.

CLOCK UNIT

Figure 5:
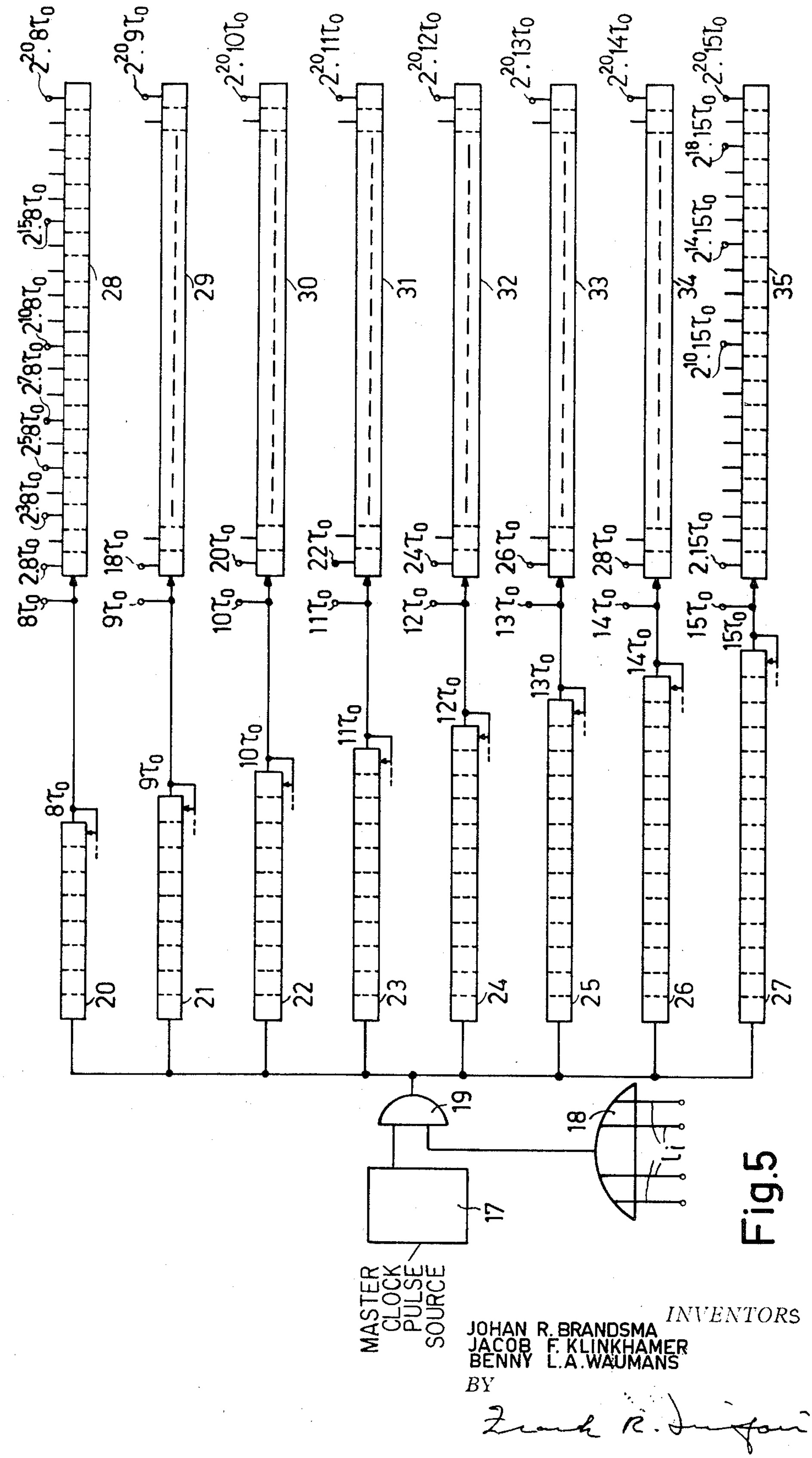
FIG. 5 shows a clock unit to be used for the simulation according to the invention.

The clock unit is shown in FIG. 5. The user of the digital simulator is to have a large number of clock pulse signals available having periods covering the entire range between the speed of the fastest module to be simulated and the speed of the slowest module to be simulated (compare the above example of a relation 1 : $4.10^5$ between a card reader and a read-only store). It must be possible to stop all clock pulse signals at the same instant, when a simulation is to be interrupted for some reason, (for example, in the case of an alarm) and to produce all these signals (again) simultaneously. To this end, the clock unit (FIG. 5) is constructed such that all clock pulse signals originate from a master clock pulse signal from a master clock pulse source 17. The master clock pulses of a period $\tau_o$ are applied to a series of shift registers 20, 21, 22 . . . 27 via an AND-function gate 19 which is conditioned by an OR-function gate 18 to which a number of condition signal lines $1_i$ are connected. In this example, the shift register 20 comprises eight flipflops so that an output pulse appears after 8 clock pulses $\tau_o$ ($t_o = 8\ \tau_o$). The shift register 21 comprises nine flipflops so that an output pulse appears after 9 clock pulses $\tau_o$ ($t_1 = 9\ \tau_o$). The same holds good for the other shift registers: $t_2 = 10\ \tau_o$, . . . $t_7 = 15\ \tau_o$. After $t_1$, $t_2$ . . . the various registers 20, . . . 27 are reset and a new cycle is started. Each of the various register outputs is connected to a counter 28, 29 . . . 35. In this example each counter has twenty stages, on the outputs of which clock pulse signals appear having periods of: counter 28: 2.8 $\tau_o$; $2^2$0.8 $\tau_o$; $2^3$0.8 $\tau_o$; . . . $2^{20}$0.8 $\tau_o$ counter 29: 2.9 $\tau_o$; $2^2$0.9 $\tau_o$; $2^3$0.9 $\tau_o$; . . . $2^{20}$0.9 $\tau_o$ counter 30: 2.10 $\tau_o$; $2^2$0.10 $\tau_o$; $2^3$0.10 $\tau_o$; . . . $2^{20}$0.10 $\tau_o$ counter 35: 2.15 $\tau_o$; $2^2$0.15 $\tau_o$; $2^3$0.15 $\tau_o$; . . . $2^{20}$0.15 $\tau_o$. The range covered by this clock unit thus extends from 8 $\tau_o$ to $2^{20}$ . 15 $\tau_o$, which is approximately 1 : 2.10$^6$. In most cases this will be sufficient. The unit can be extended without difficulty.

Figure 6:
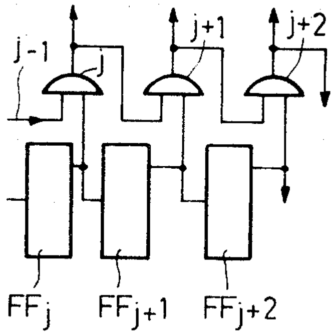
FIG. 6 shows an AND-function gate for the clock unit shown in FIG. 5.

In order to derive the above-mentioned clock signals from the counters 28 . . . 35, the outputs of the stages of the counters are connected to an AND-function gate: FIG. 6. A flipflop $FF_j$,$FF_{j+1}$, $FF_{j+2}$ has an AND-function gate $j, j+1, j+2$, respectively, on its output. Another input of an AND-function gate $j, j+1, j+2$ is connected to the output of a preceding AND-function gate. It is thus achieved, that the desired clock pulse signals whose period is always $\tau_o$ are indeed produced. So: a first 8 $\tau_o$ pulse to counter 28 makes the first stage thereof assume the 1-position; in reaction to a second 8$\tau_o$ pulse this stage is reset and only the AND-function gate on this stage is opened, thus allowing a pulse having a pulse period $\tau_o$ to pass. Consequently, the latter was produced after 2.8 $\tau_o$.

PRESETTING UNIT

For a simulation, it will be necessary that a number of simulation modules are preset. This presetting may be in the form of setting of a single flipflop etc. to a given position, but also of registers and counters. The presetting of a counter or register may be effected in parallel for all stages simultaneously, or in series by shifting through the stages. Information bits "0" and "1" may be represented by a position of a switch, and may be applied to a module to be preset via a conductor. Presetting can also be automated, for example, by providing a punched tape with presetting information, and applying this information to the desired module via a punched tape reader.

DIGITAL CHANNEL SIMULATION MODULE

An important computer function is the function, or are the functions, which are (can be) performed by the channel units. These functions are in particular the processing of information in various computer modules at a limited speed, and the transport of information between computer modules via a limited interface.

The task performed by the digital simulation module for the channel unit consists of the counting down of a given period of time. During this period of time the channel is occupied, and is subsequently free again.

If a request-for-use of the channel is made, it will be granted only, and a channel cycle will be started only, if the channel is free at that instant.

If the duration of a channel cycle is to be a period T, and the counting capacity of the counter is $2^n$, the period of the frequency of the clock pulse signal applied to the channel simulator is to be a period $\tau = T/2^n$. From this it follows, that the adaptation of the channel simulator to a new situation can be simply effected merely by changing the clock pulse frequency.

If a channel simulator is used as a building block in an extensive computer system simulation device according to the present invention, it is necessary that the channel simulator can be adapted to its surroundings, i.e., that it can be conditioned by its surroundings. In order to avoid the necessity of inserting many additional AND-function gates at random for this purpose, it is useful to connect the condition signal lines directly to inputs of AND-function gates provided in the channel simulator itself.

Figure 7:
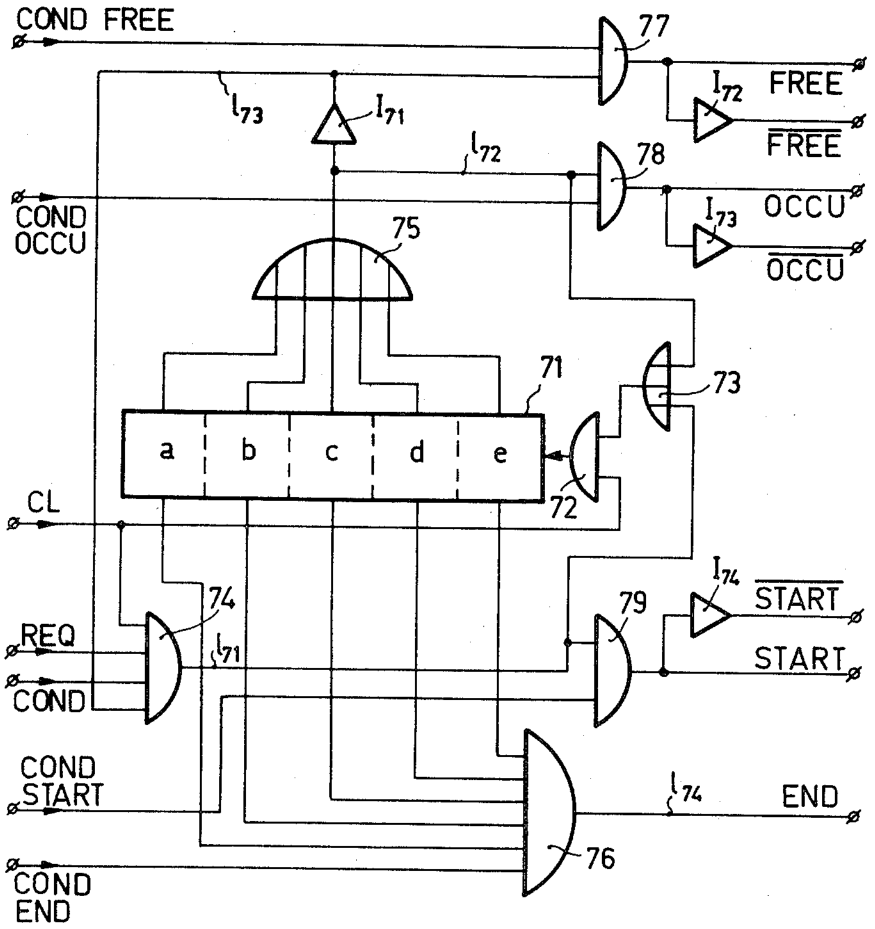
FIG. 7 shows a digital channel simulation module.

FIG. 7 shows the cicuit diagram of the digital channel simulation module. In FIG. 7, the reference numeral 71 denotes a counter having counting stages *a*, *b*, *c*, *d*, *e*. The reference numerals 72, 74, 77, 78 and 79 denote AND-function gates, and the reference numeral 73 denotes an OR-function gate. The reference numeral 75 denotes a channel-occupied detector which may consist, for example, of an OR-function gate, depending on the counter coding. The reference numeral 76 denotes an end-channel-occupation detector which may be, for example, an AND-function gate, depending on the counter coding. The elements denoted by $I_{7i}$ are inverters. The counter 71 is preceded by the first AND-function gate 72 having a terminal for receiving the clock pulse signal CL and a terminal which is connected to the output of the first OR-function gate 73. The first OR-function gate 73 has an input terminal which is connected to the output of the second AND-function gate 74. This output carries a start signal on a start signal line $1_{71}$ if a request-for-use signal REQ, an end-channel-occupation signal FREE, a clock pulse and, in this case, also an extra condition signal COND originating from an external source not described, are present on its respective inputs. A further input terminal of the OR-function gate 73 serves for supplying, via a channel-occupied signal line $1_{72}$, a channel-occupied signal arising on the output of the channel-occupied detector, in this case an OR-function gate 75, the inputs of which are connected to the outputs of the counting stages *a* . . . *e*. The output of the inverter $I_{71}$ presents the complement of the channel-occupied signal, i.e., the end-channel-occupation signal on the signal line $1_{73}$. The outputs of the end-channel-occupation detector, in this case an AND-function gate 76, are also connected to the respective outputs of the counting stages *a* . . . *e*, a further input in this case being connected to an extra condition signal line COND END originating from an external source not described. In this way the END-signal is produced on the output of gate 76 at the end-channel-occupation signal line $1_{74}$. Other condition signals COND FREE, COND OCCU (occupied) and COND START also originate from external sources not described and condition the outputs FREE, OCCU and START of the channel simulator by means of the AND-function gates 77, 78 and 79 provided in this simulator. The complements $\overline{FREE}$, $\overline{OCCU}$ and $\overline{START}$ of these signals can also be created by means of inverters $I_{72}$, $I_{73}$ and $I_{74}$.

If the channel is intended as a simulator for an interface limitation between two modules, one module can present a request-for-use signal REQ to the AND-function gate 74 and the other module can present a condition signal COND to this gate as an indication that reception can take place. If the channel, in this case the channel simulator, is free, which is denoted by an end-channel-occupation signal on line $1_{73}$, the request-for-use signal REQ is granted upon a clock pulse. If the channel simulator is used for other purposes, the signals REQ and COND may also represent conditions other than mentioned above. In this case the counter 71 comprises five stages and the channel simulator is considered to be free if the counter position is equal to 00000. This is detected by the OR-function gate 75, so that after the invertor $I_{71}$ a 1-signal arises as an end-channel-occupation signal on line $1_{73}$. When the first clock pulse arrives, the AND-function gate 72 opens via the OR-function gate 73. At this instant the line $1_{71}$ carries a starting signal which appears as START on an output of the channel simulator via the AND-function gate 79 which is conditioned by the COND START signal. The REQ signal for the AND-function gate 74 can be de-activated herewith and/or a subsequent module can be conditioned again, etc. At the same time the channel simulator is occupied, which follows from the fact that due to a first 1 in the counter the output of the OR-function gate 75 carries a 1-signal. A signal is thus present on the channel-occupied signal line $1_{72}$. This line $1_{72}$ is connected to the OR-function gate 73 so that the AND-function gate 72 remains open, even if in the meantime after the first clock pulse no signal is present on the starting signal line $1_{71}$ because of the disappearance of one of or both signals REQ and COND, which have also been derived from, for example, clock pulse signals. As described above for $1_{74}$, the internal signals on lines $1_{72}$ and $1_{74}$ may appear as conditioned output signals OCCU and FREE in AND-function gates 78 and 77 respectively, conditioned by external signals COND OCCU and COND FREE, respectively, and possibly also as signals $\overline{\text{OCCU}}$ and $\overline{\text{FREE}}$ after complementing in invertors $I_{73}$ and $I_{72}$, respectively.

After having been started, the counter 71 counts the arriving clock pulses until the capacity of the counter is reached ($2^n$, in this case $2^5$) and the channel simulator becomes free again. Just before this instant the position 11111 of the counter is detected by means of the AND-function gate 76 and, as soon as the $(2^n - 1)$, in this case the 31$^{st}$, clock pulse has been counted, an END-signal is given on line $1_{74}$. This means that upon the next clock pulse, the channel simulator becomes free again. In this case, the AND-function gate 76 is again externally conditioned by means of a COND END signal.

It appears from the foregoing, that if an interface transport, an occupation of a module, a delay etc., has to last T time units, the clock pulse frequency to be applied to the channel simulator will have to have a period of $\tau = T/2^n$, in this case T/32 time units. For example, if the limited speed of a store is to be simulated, $\tau$ = (store-cycle time)/$2^n$. When acting as a delay, it is obvious that each time after a period T an end-channel-occupation signal arises on line $1_{74}$. It is to be noted that signals which are to be delayed, have a period which exceeds T in order that no erroneous results are obtained. If a signal is to be delayed by a period $A<T$, a number of N channels is to be used in parallel, subject to the condition $N > T/A$.

The channel simulator can also be used as a delay at random between O and T time units. In this case the REQ signal has to be always present so that the channel simulator is always in operation. If a delay is desired, the COND FREE input is activated and it will take an arbitrary time between O and T time units before the FREE signal occurs on the output of the AND-function gate 77. The probability of occurrence of delay $T/2^n$, $2T/2^n \ldots 2^nT/2^n$ is equal for all terms. The channel simulator used as a random delay unit represents, for example, a search-simulation in a disc store. The channel simulator in that case has a T which is equal to the duration of one disc rotation.

The channel simulator can also serve as a pulse repetition frequency multiplier. If one REQ signal is to deliver a number of N pulses, and a clock pulse of a frequency $K_1$ is applied as a clock pulse signal, the COND OCCU input of AND-function gate 78 is to be supplied with a clock pulse signal of a frequency $K_2 = N \cdot K_1/2^n$.

For example, a card reader can be simulated by means of a channel simulator which is used as a pulse multiplier. In this case the time T must be equal to the time which is required for reading one card. The multiplication factor must be 80 which is equal to the number of columns per card, and the REQ signal is the card read command signal. In this way, it is achieved that 80 pulses appear on the OCCU output as a simulation of the 80 columns on a card per card read period T.

Figure 8:
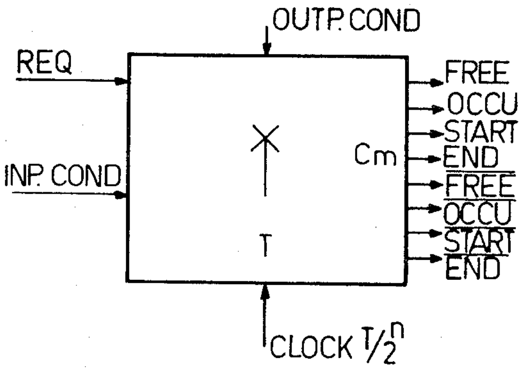
FIG. 8 shows a schematic for denoting a channel simulation module.

FIG. 8 shows a schematic for denoting a channel simulation module. The reference T denotes the channel cycle time, CLOCK is the clock pulse signal which must have a period of $\tau = T/2^n$ so as to obtain a cycle time T, said clock pulse signal having to be supplied by the above-mentioned clock unit. An input INP. COND denotes the possibility of introducing external input conditions, such as COND (see the AND-function gate 74 of FIG. 7). An input OUTP. COND denotes the possibility of introducing external output conditions, such as COND FREE, COND OCCU etc. This is also shown in FIG. 7.

DIGITAL BUFFER SIMULATION MODULE

An important computer function is the function, or are the functions, which are (can be) performed by the buffer units. These functions are mainly hardware buffering: shift register capacities in processors in peripheral equipment etc., and also the complete store-unit capacities (magnetic cores, disc, card read/write stores etc.) The buffer simulation module will be described hereinafter with reference to FIGS. 9 and 10.

Figure 9:
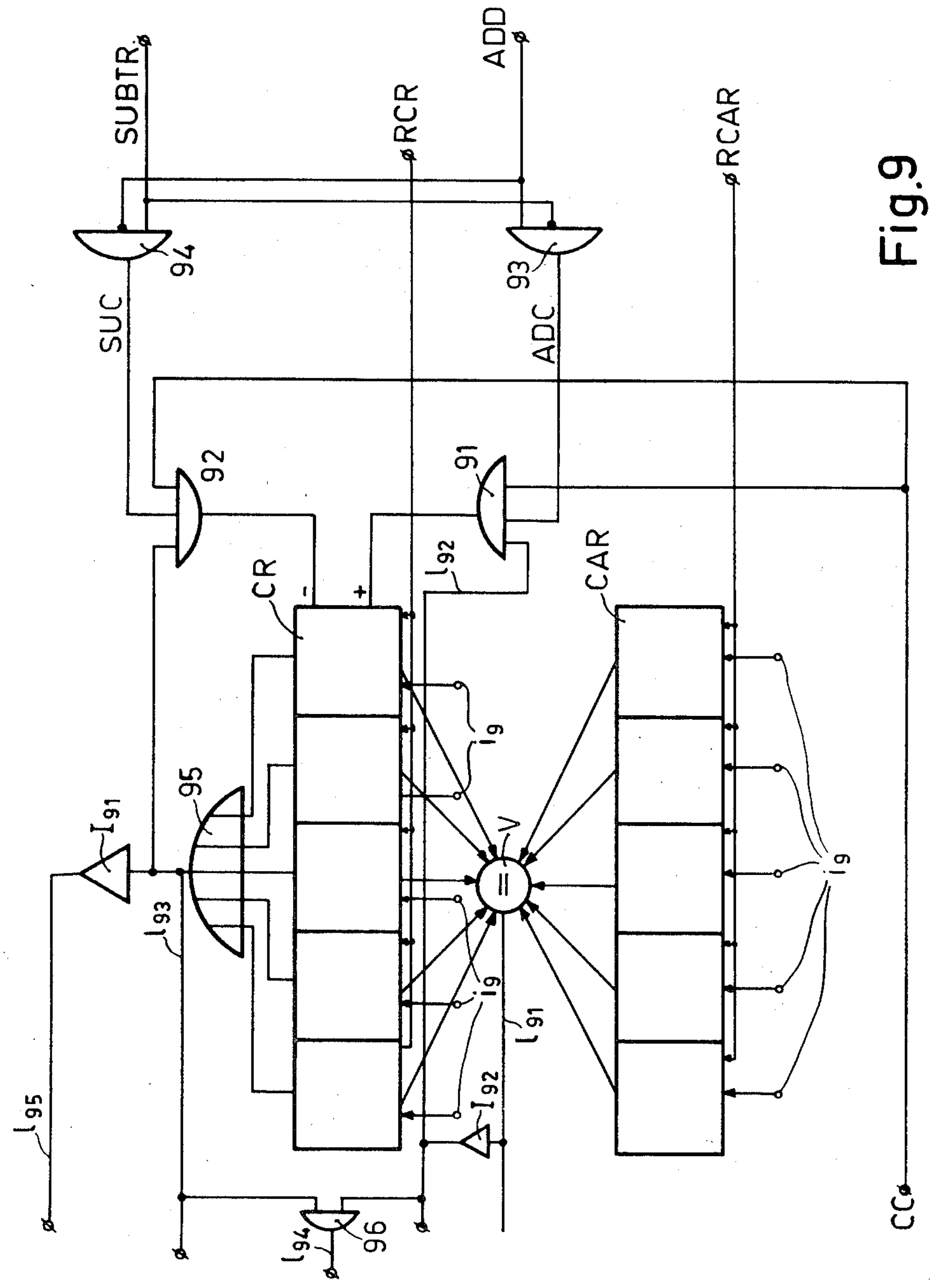
FIGS. 9 and 10 show a digital buffer simulation module.

In FIG. 9 the letters CR denote a counting register having an add input "+" and a subtract input "−". The letters CAR denote a capacity register. The capacity register CAR may be set across its inputs $i_9$ (per register stage) to a given capacity as a representation of the capacity of the buffer to be simulated. It is also imaginable, that an initial value is desired in the counting register, so as to denote that the buffer to be simulated is already partly (or, if applicable, even entirely) filled. This setting of the counting register CR can be effected across its inputs $i_9$ (per counting register stage). The resetting of the counting register CR can be effected via line RCR, and the resetting of the capacity register CAR can be effected via line RCAR. In a comparison device V the contents of the counting register CR are compared with the capacity stored in the capacity register CAR. In the case of equality, a signal line $1_{91}$ carries a full-signal. For the control of the buffer simulation module there is furthermore provided, a first AND-function gate 91, the inputs of which receive, via a not-full signal line $1_{92}$, a clock pulse signal CC; an add command ADC; and a not-full signal arising in an invertor $I_{92}$ as a complement of the said full-signal. The output of the AND-function gate 91 is connected to the add input "+ " of the counting register. Also provided is a second AND-function gate 92, the inputs of which receive the clock pulse signal CC, a substrate command SUC, and a not-empty signal via a not-empty signal line $l_{93}$. The not-empty signal arises on the output of a not-empty detector 95 which may be, for example, a OR-function gate, depending on the register coding used; the outputs of the counting register stages being connected to the inputs of said gate. The output of the second AND-function gate 92 is connected to the subtract input of the counting register CR.

The AND-function gates 93 and 94 are provided to ensure that when an add signal ADD and a subtract signal SUBTR arrive simultaneously, both signals cancel each other, and the contents of the counting register CR are not changed. For this purpose, the ADD input is applied in an inverted manner (denoted by ".") to the AND-function gate 94, to which the input SUBTR is also applied. Conversely, the SUBTR input is applied in an inverted manner to the AND-function gate 93, to which the input ADD is also applied. The not-empty signal line $l_{92}$, and the not-full signal line $l_{93}$, are connected to inputs of a third AND-function gate 96, such that on the output of the latter, a neither-empty-nor-full signal can arise on a neither-empty-nor-full signal line $l_{94}$. Via the invertor $I_{91}$, an additional empty signal arises on a signal line $l_{95}$ as a complement of the not-empty signal on $l_{93}$. When clock pulses occur, the buffer simulation module will be filled upon an add command ADC, which arises when the ADD input carries a 1-signal and the SUBTR input does not carry a 1-signal. In reaction to a subtract command SUC, arising when the SUBTR input carries a 1-signal and the ADD input does not carry a 1-signal, the buffer simulation module will be emptied. The not-full signal is applied via line $l_{92}$ to the first AND-function gate 91 to prevent the buffer simulator from being filled further after it is already full. In the case of subtraction, the not-empty signal is for the same reason applied via the line $l_{93}$ to the second AND-function gate 92, so that the buffer simulator cannot be emptied further after it is empty already. As long as a counting register stage still carries a 1-bit signal, the not-empty detector 95, in this case an OR-function gate, still has a 1-signal as an output signal. If the buffer simulator is empty, the contents of the counting register are 00000 so that no 1-signal is present on the line $l_{93}$, so that the AND-function gate 92 is closed.

It is to be noted, that the filling and emptying of the buffer simulator is, of course, alternatively possible by providing the clock pulse input CC with a continuous 1-signal and the inputs ADD and SUBTR, respectively, with a pulse series.

Figure 10:
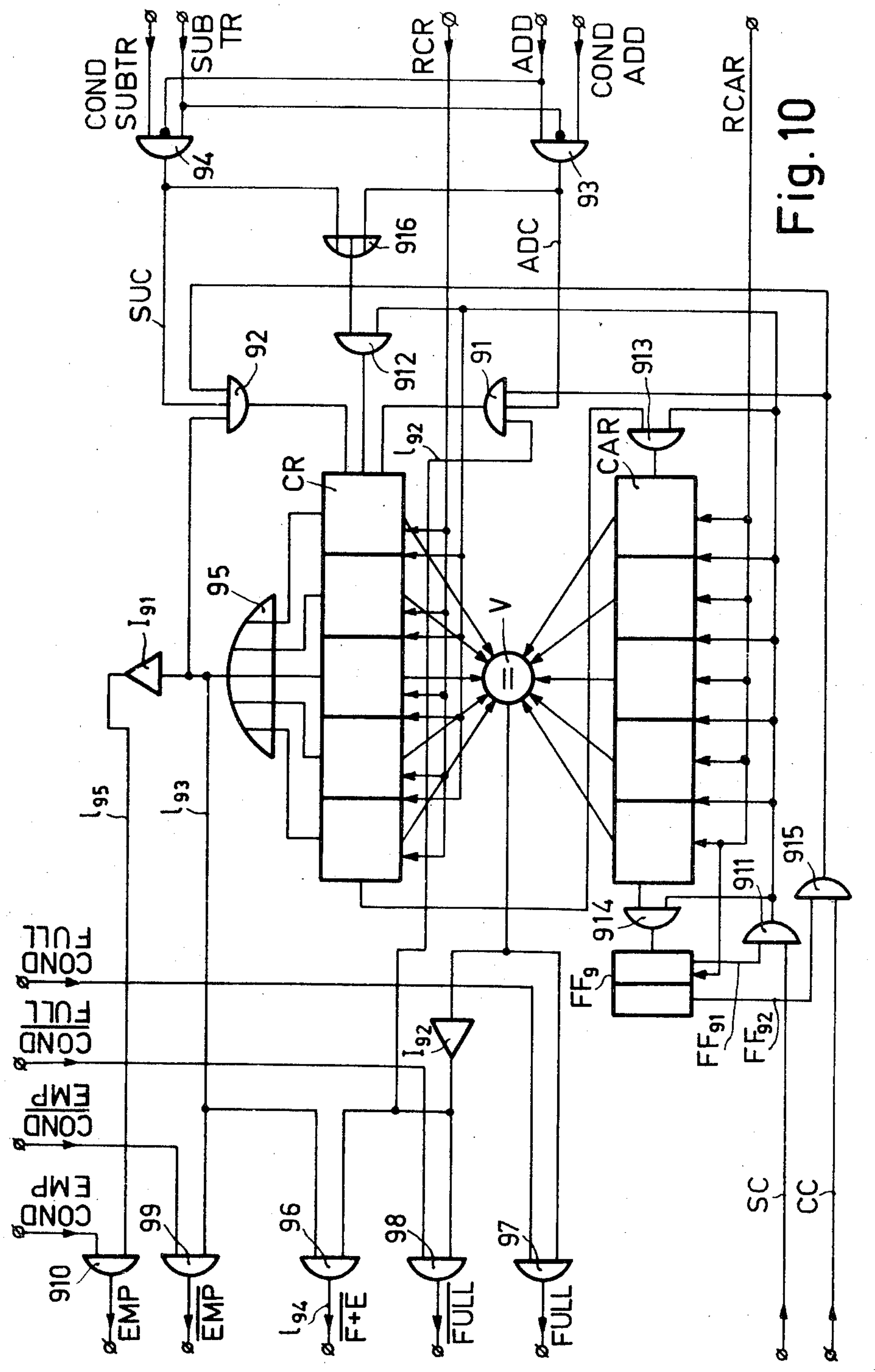

The buffer simulator shown in FIG. 10, is the same as the simulator shown in FIG. 9 with addition of some elements. First of all, the AND-function gates 97, 98, 99 and 910 have been added, to which, in addition to the signal lines $l_{91}$, $l_{92}$, $l_{93}$ and $l_{94}$, the external condition signals CONDFULL, $\overline{\text{CONDFULL}}$, $\overline{\text{CONDEMP}}$ and CONDEMP are applied. The output signals are the conditioned signals FULL, $\overline{\text{FULL}}$, $\overline{\text{EMP}}$ and EMP. The AND-function gate 93 may be provided in the same manner with an external condition CONDADD and the AND-function gate 94 may be provided with condition CONDSUBTR. It is thus possible to adapt the buffer simulator to its surroundings when it forms part of a large digital computer configuration simulation according to the present invention.

The following elements have also been added: flipflop $FF_9$, AND-function gates 911 . . . 915 and OR-function gate 916, which serve to obtain presetting of a buffer-simulation in a series-controlled manner. During the presetting phase, the flipflop $FF_9$ is reset and $FF_{91}$ carries a 1-signal. A shift clock signal SC is present which provides the counting register CR, as well as the capacity register CAR, with shift pulses via the AND-function gate 911, which is conditioned by the $FF_{91}$ 1-signal. The presetting information to be shifted in, is applied, preceded by a 1-bit, to an input of an AND-function gate 912 via the AND-function gate 93 or 94, and via the OR-function gate 916. In reaction to the shift pulses applied to the other input of the AND-function gate 912, the information is shifted into the counting register CR. For the time being, both registers CR and CAR will be considered to be one register since one line $l_{96}$ connects the register CR to the other register CAR, via an AND-function gate 913 conditioned by the shift pulses. Therefore, in this example, the leading 1-bit is shifted into the capacity register CAR after six shift pulses, and the desired capacity value for the buffer simulator will be present in the counting register CR. After another five shift pulses, i.e., after a total of 11 shift pulses, the leading 1-bit has been shifted into the flipflop $FF_9$. The capacity has then arrived in the capacity register CAR, and desired presetting of the counting register CR is also achieved. The arrival of the leading 1-bit in the flipflop $FF_9$ sets the latter, and output $FF_{92}$ then carries a 1-signal instead of the output $FF_{91}$. The shifting phase is then completed, and the add subtract phase, or in other words the filling/emptying phase, can commence.

The buffer simulator can also be used as a divider for pulse frequencies. The capacity is set at N - 1, if the desired divider is N. The ADD input carries a 1-signal so that the incoming clock pulses increase the contents of the counting register. In this case the clock pulses are also applied to the CONDFULL input. If N-1 pulses have been counted, the maximum capacity is reached, but, since the FULL output is conditioned by the clock pulse input, the FULL output will be active only at the $N^{th}$ clock pulse. At this instant, the counting register is reset, and the procedure is started again. If the incoming pulse series is periodical, the outgoing pulse series will also be periodical.

Figure 11:
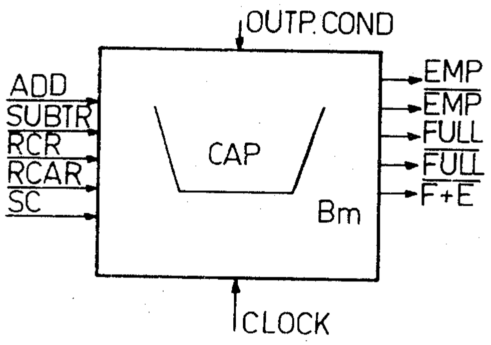
FIG. 11 shows a schematic for denoting a buffer simulation module.

FIG. 11 shows a schematic for the buffer simulation module. The inputs and outputs are self-explanatory with reference to FIG. 10.

PRIORITY MODULE

An important computer configuration function, is the function performed by the priority circuit. This function is to grant or admit requests for use of a given portion of a module of the configuration in accordance with a priority diagram. These requests may be requests for use of the central processor, the internal store, etc. In a simulation configuration, the possiblity of such a priority designation must be present. The priority module may in principle by any priority circuit, as the demands imposed on such a circuit are the same during simulation, as when the circuit is incorporated in a computer configuration itself. In view of the flexibility, however, it is desirable for the priority diagram in the priority module to be readily changeable. For example, there may be a fixed priority diagram in which a given request always has the highest priority, etc. There may also be a round-robin priority diagram, i.e., the priority changes cyclically. It is alternatively possible that random priority exists: it cannot be predicted which request, from a number of requests will be granted.

Figure 12:
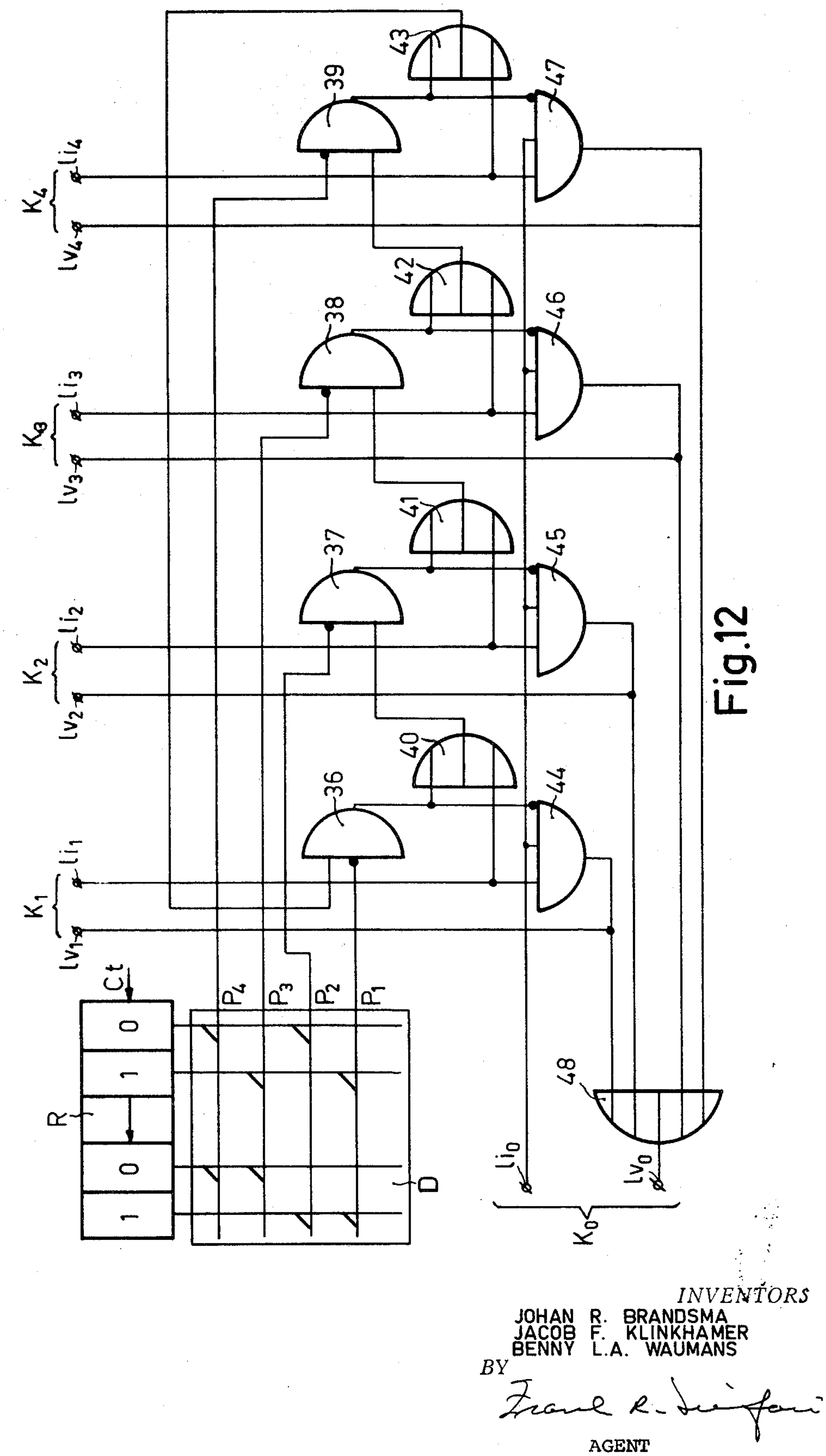
FIG. 12 shows the diagram of a priority module.

FIG. 12 shows an example of a priority module. The module comprises a number of AND-function gates 36 . . . 39, 44 . . . 47, a number of OR-function gates 40 . . . 43 and 48, and a register R having a decoder D. This module can deal with four incoming lines $li_1$, $li_2$, $li_3$ and $li_4$ carrying requests. The priority is governed by the decoded outputs of the two-bit register R. For the description of the module, it is assumed that all lines $li_1$ . . . carry a request signal, and that the register R is in a given position: the outgoing lines $P_1$ of the decoder D carries a 1-signal, the other lines $P_2$, $P_3$ and $P_4$ carrying a O-signal. AND-function gate 36 receives a 0-signal via line $P_1$ (due to the inverting input "."). As lines $P_2$, $P_3$ and $P_4$ carry a 0-signal, and as all lines $li_1$ . . . present a request signal, the out-puts of the AND-function gates 37, 38 and 39 carry a 1-signal. The signals from AND-function gates 36 . . . 39 are applied to the respective AND-function gates 44 . . . 47 in an inverted manner ("."). The outputs of 45, 46 and 47 then carry a 0-signal. If the module to which access is requested is free, this state being denoted by a 1-signal on line $li_o$, the AND-function gate 44 is open and a 1-signal appears on the release line $lv_1$, indicating that the request on $li_1$ can be granted. The module to which access is requested, recieves a 1-signal via line $lv_o$ as an output signal of an OR-function gate 48 to which the outputs of the AND-function gates 44 . . . 47 are connected. If no request is present on line $li_1$, the output of the OR-function gate 40 carries a 0-signal, so that in that case, the output of the AND-function gate 37 also carries a 0-signal. As a result, the output of the AND-function gate 45 will carry a 1-signal (assuming that a request is present on line $li_2$), and the request on line $li_2$ will be granted. Consequently, if line $P_1$ carries a 1-signal, the priority diagram is in this case: $li_1$, $li_2$, $li_3$, $li_4$. If line $P_2$ carries a 1-signal, the diagram is: $li_2$, $li_3$, $li_4$, $li_1$. Any desired sequence can be adjusted by means of shift pulses to register R and by choosing the decoding matrix D. If a fixed priority diagram is required, the register R is superfluous since in such a case one of the lines $P_1$ . . . $P_4$ can carry a 1-signal. If a round-robin priority is used, the register contents are to be changed across input Ct each time a request is granted. This change may be controlled, for example, by the 1-signal appearing if the request on line $lv_o$ is granted. The letters $k_1$, $k_2$ . . . denote connections to modules from which the requests originate, and the reference $K_o$ denotes the connections to the module to which access is requested.

If the priority module is required for collecting pulses of various incoming lines, buffer simulation modules will have to be provided at the input. If two pulses arrive simultaneously (on different lines), one pulse must be buffered so as to prevent it from being lost. This is described hereinafter under the heading "submodule." The priority module as described here can indicate priorities for four requests. If more requests are to be dealt with, the priority module will have to be extended.

Figure 13:
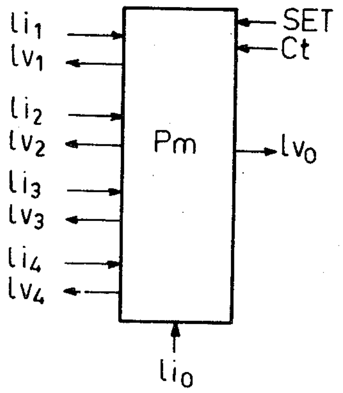
FIG. 13 shows a schematic for the priority module.

FIG. 13 shows a schematic for the priority module. The references are self-explanatory with reference to FIG. 12. The input SET denotes the adjustment of the priority module to one of the priority diagrams possible.

The simulation of digital computer configurations requires another number of modules: counter modules capable of taking in a number of positions which can be used for control purposes.

Decoding modules are also used for control purposes in conjunction with the counter module. Counting positions are decoded so as to apply control signals at desired instants. After each clock pulse the counter assumes a next position which is decoded again, etc. If one of the decoding output lines is connected to the counter reset input, the counter is made cyclical. Instead of a counter, a buffer simulation module may also be used. The length of a cycle is then determined by the capacity of this buffer simulation module. The decoding module may be connected to the outputs of the buffer contents counter (CR).

Figure 14:
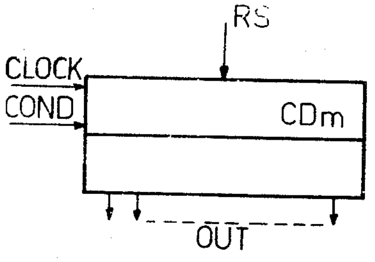
FIG. 14 shows a schematic for a counter-decoding module.

FIG. 14 shows the schematic for the decoding counter module. In addition to the clock pulse input CLOCK, a condition input COND is provided. The letters RS denote a reset input. The letters OUT denote the outputs. If a warning indication is to be present, a decoding module may be connected to a buffer simulation module so that, if an "almost critical" situation arises, an indicator (for example, a lamp) connected to the relevant decoding module is activated.

Figure 15:
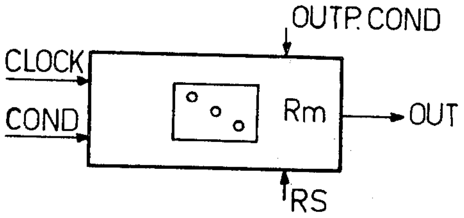
FIG. 15 shows a schematic for a pulse randomizer module.

A pulse randomizer module, which supplies a 1-signal or a 0-signal at equal intervals after reception of a clock pulse is shown in schematic in FIG. 15. This module may be used for simulating a central processor, a store access. The construction of a real pulse randomizer module is difficult, but the construction of a pseudo-pulse randomizer module can be simply effected by means of a shift register. Some of the stages of this register are fed back to the register input via an exclusive-OR-function gate. In general, it may be stated that the longer the shift register, the better the random distribution occurring at the output. This subject has been extensively dealt with in literature.

Furthermore, a selection module may be required. By means of this module one out of *m* other modules can be selected for the transport of information to and fro, via the selected path. In practice, it is also useful to have gate modules and flipflop modules available. If a computer configuration is to be simulated, it may be necessary to have freely usable flipflops available. A flipflop module may comprise a number of functionally independent flipflops, which can be inserted where required. The same applies to the use of gates. In addition to the above-mentioned extra AND-function gates (in buffer simulation modules etc), other AND-function gates than those contained in gate modules will be required for other purposes, such as for restarting conditions for control counters.

Figure 16:
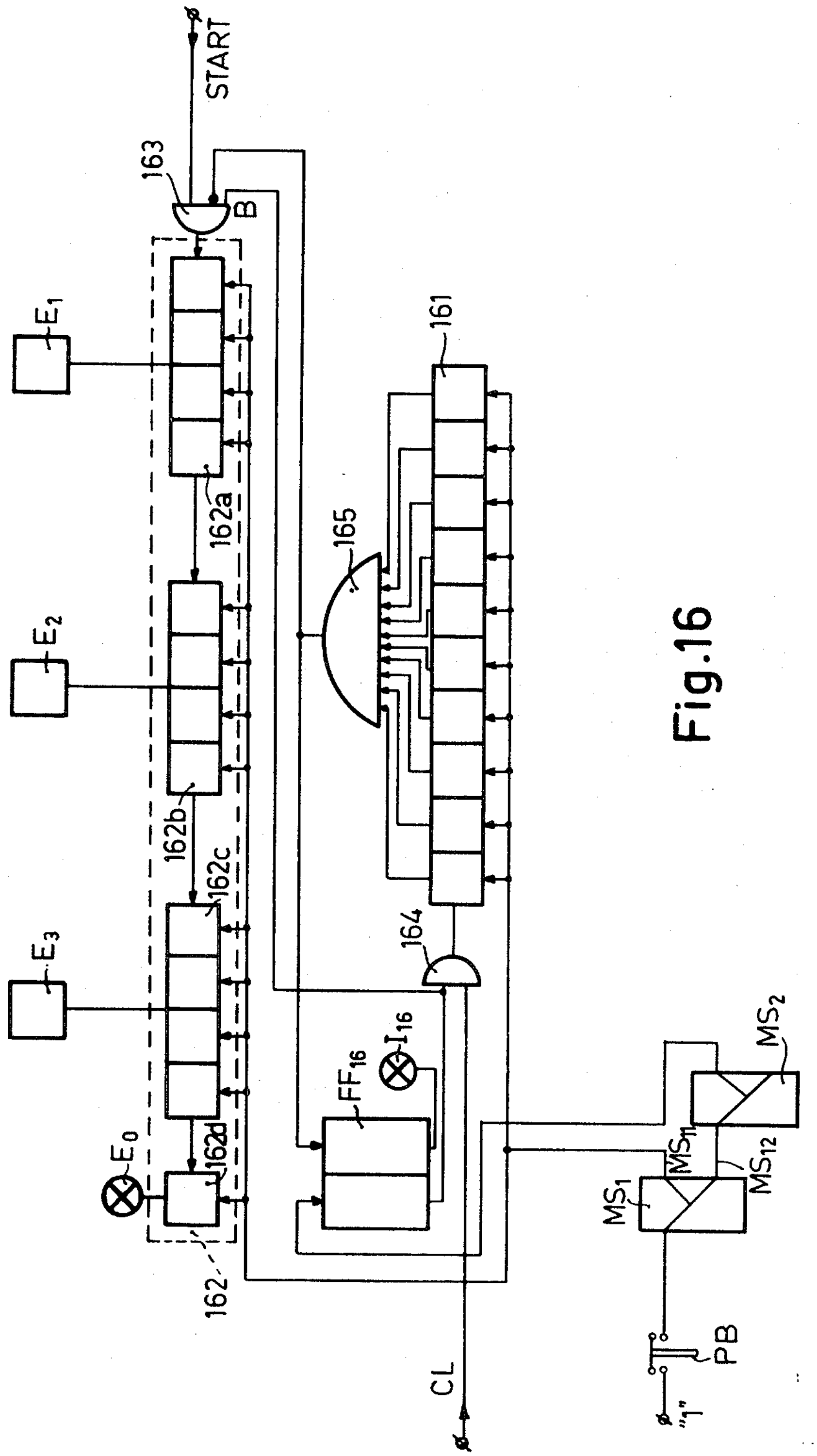
FIG. 16 shows a diagram of a display module for measuring degrees of occupation.

Finally, display modules are required which serve for displaying the contents of channel simulation modules, buffer simulation modules, or counter modules, by means of which it is possible to make intermediate results, alarm causes, etc. visible. A very suitable display module is a relative-degree-of-occupation meter, capable of indicating a percentage which is a measure of the occupation density of, for example, a channel and, consequently, of a channel simulation module. FIG. 16, shows an example of such a degree-of-occupation measuring module. Assume that the degree of occupation of a channel simulation module is to be determined: 161 is a maximum capacity register counting the maximum number of requests for use of the channel simulation module, which this module is capable of handling. For this purpose, a clock signal CL is applied to this register 161, the frequency of which is equal to $1/2^n$ ($2^n$ = 32 in this case) of the frequency of the clock signal of the channel simulation module itself. The register 161 comprises 10 stages in order to ensure that the time in which the percentage is determined, is sufficiently long to obtain a true idea of the degree of occupation. For the sake of simplicity, the register does not apply a 1-signal to the output of an AND-function gate 165 when the position 1024 is reached, but rather when the position 1000 is reached. For this purpose a number of outputs are associated with gate 165 in an inverted manner ("."), i.e.; binary 1111101000 = 1000 decimal. A degree-of-occupation counter 162 counts the requests for use of the channel simulation module which are actually granted. In this case, the counter 162 is represented as a binary-decimal counter having three 4-bit registers 162*a*, 162*b*, 162*c*. After decoding, each of said registers supplies a decimal digit in an indicator $E_1$, $E_2$ and $E_3$, respectively. If the occupation is 100 percent, the counting stage 162*d* assumes a 1-position, in which position an indicator $E_0$ can light up. The determination of the degree of occupation is started by means of a pushbutton PB, activating a monostable multivibrator MS1. The 1-signal output $MS_{11}$ ensures that the counter 161 and the counter 162 are set to the O-position. After that, the output $MS_{12}$, receiving a 1-signal again after resetting of $MS_1$, ensures that a second monostable multivibrator $MS_2$ is activated. This multivibrator $MS_2$ sets a flipflop $FF_{16}$. This flipflop $FF_{16}$ conditions an AND-function gate 164, which then allows the clock pulses of clock signal CL to pass to the counter 161. The AND-function gate 163, also conditioned by the flipflop $FF_{16}$, also allows the START pulses, supplied by the channel simulation module each time a request-for-use-signal is granted, to pass to the occupation counter 162. The degree-of-occupation-measuring module remains active until the counter 161 reaches the position 1000 (decimal). This position is recognized by the AND-function gate 165, and the latter supplies a 1-signal which resets the flipflop $FF_{16}$, so that the counting of the pulses CL in counter 161 is stopped. The inverted (".") 1-output signal of 165 is applied to the AND-function gate 163, and ensures that the counter 162 does not make any further steps either. An indicator $I_{16}$ on the flip-flop $FF_{16}$ lights up to indicate, that the contents of the occupation counter 162 can be read as a degree-of-occupation percentage on the indicators $E_1$, $E_2$ and $E_3$. This percentage can be given in three decimals, i.e., to units of 0.1 percent.

For simulating computer configurations, it may also be necessary to have the possibility of selecting one line or situation, from a group of lines or situations.

SUBMODULE

Figure 17:
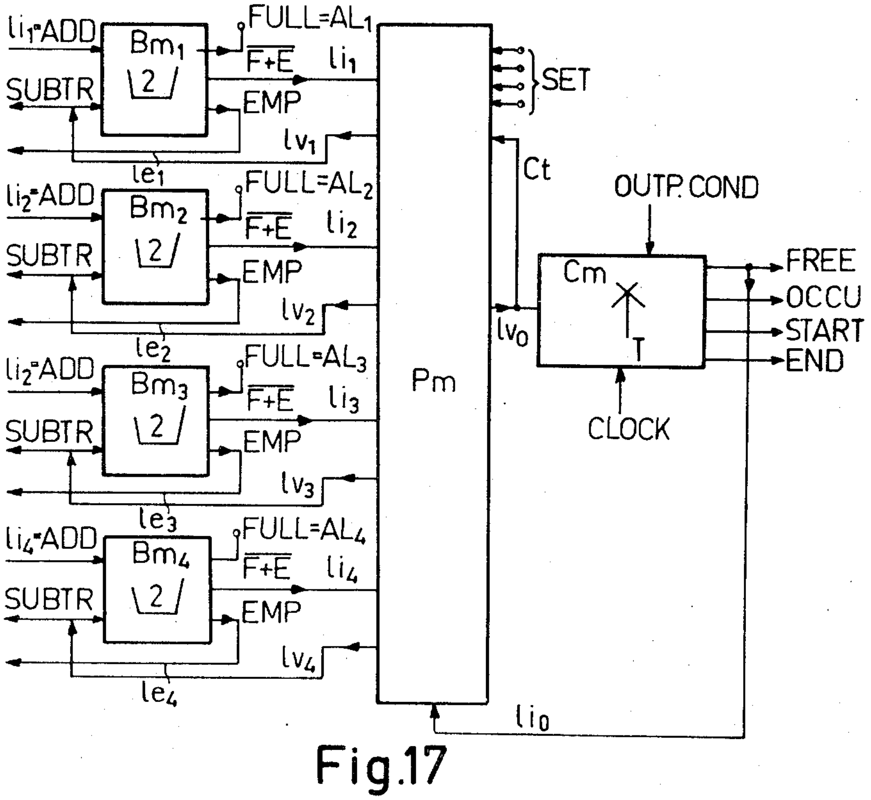
FIG. 17 shows a diagram of a submodule consisting of various other modules.
Figure 18:
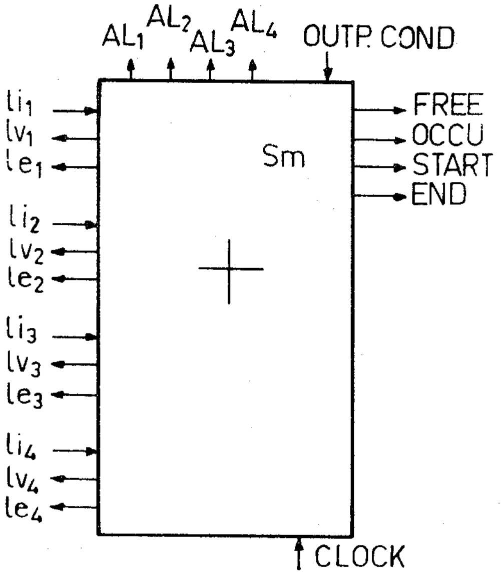
FIG. 18 shows a schematic for the submodule shown in FIG. 17.

An important configuration of simulation modules is a so-called submodule Sm, comprising four buffer simulation modules $Bm_1 \ldots Bm_4$, one priority module Pm, and one channel simulation module Cm: see FIG. 17, and the schematic therefor in FIG. 18. If requests from various incoming lines $li_1 \ldots li_4$, are to be collected for the priority module P*m*, and if two request pulses arrive simultaneously, one request pulse has to be buffered so as to prevent request pulses from being lost. In this example, each buffer simulation module has a capacity of two pulses. This is to indicate that in this case, for example, a disc store is involved, in which always a preceding character of a disc is to be dealt with (transported etc.) before the next character is dealt with. Consequently, if two requests arrive consecutively on a line (ADD of $Bm_1$), without one of these requests being granted, something must be wrong, and an alarm occurs if the buffer simulation module is full: FULL = $AL_1$ for $Bm_1$, for $Bm_2$ : $AL_2$ etc.

A request remains stored in a buffer simulation module until it is granted. Granting means that the priority module Pm produces a 1-signal on the relevant lv line. By means of this signal, the relevant buffer is reset, (SUBTR line) and at the same time this is passed on to the module making the request. The empty signal on line EMP informs the module making the request, that no requests of this module itself are waiting. The priority module Pm can grant a request only if a 1-signal arrives from the channel simulation module Cm via the line $li_o$, indicating that the channel is free. After each request has been granted, the channel simulation module will be occupied for at least one channel cycle period T. The submodule Sm as set forth, will be often used, particularly if continuous information flow models are to be simulated. In this case, this submodule is capable of adding flows, and also of adding and multiplying (by using the channel simulation module as a multiplier). Consequently, if the input flows are $Li_1$, $Li_2$, $Li_3$ and $Li_4$, the outgoing flow may be $Li_1 + Li_2 + Li_3 + Li_4$ or even $\Delta$ ($Li_1 + Li_2 + Li_3 + Li_4$).

SIMULATION EXAMPLES

CARD READER

FIG. 19 shows how a card reader can be simulated. A card reader can be simulated by means of a channel simulation module $Cm_{19}$, the card hopper associated with the card reader can be simulated by a buffer simulation module $Bm_{19}$. The character buffer can also be simulated by means of a buffer simulation module, even though the latter is not required, if the card reader is connected to a subsequent portion of the equipment, a submodule. This is because, a submodule S*m* (FIGS. 17, 18) has a buffer simulation module $Bm_1 \ldots$ for each input. If the hopper is filled, this is indicated in the buffer simulation module $Bm_{19}$ by resetting $Bm_{19}$ via the RCR input: the entire capacity N is then available. The not-full-line ($\overline{FULL}$) then carries a signal, which in this case serves as a request signal REQ for the channel $Cm_{19}$. So long as the buffer $Bm_{19}$ is not full, i.e., the hopper is not yet empty, the request REQ for the channel $Cm_{19}$ remains present. The channel $Cm_{19}$ thus continues to operate. The channel cycle time $T_{19}$ is determined by the time required for reading one card. After each cycle an end-signal END is given which ensures, via the ADD input of of the buffer $Bm_{19}$, that the buffer contents are increased by one. The output OCCU, conditioned by the COND OCCU output condition, supplies the output signals. The pulse repetition frequency at this output OCCU is determined by the character frequency of the card reader, i.e., 80 characters per card, which explains why COND OCCU receives a clock signal of T/80.

TAPE UNIT OR LINE PRINTER

During simulation, the behaviour of a tape unit and a line printer is the same. FIG. 20 illustrates a simulation run. In this case a line printer is described. The same applies to a tape unit as when a line is read for a block of information. Required are: a buffer simulation module $Bm_{20}$, simulating the line printer buffer, a channel simulation module $Cm_{20}$, simulating the time $T_{20}$ required for printing lines, and a flipflop $FF_{20}$ which serves for control purposes. Assume that the information to be printed originates from a slow core store simulation module (see hereinafter): as long as there are lines to be printed, accesses are performed on this core store simulation module. If such an access is given, a 1-signal appears on line $lv_{20}$. This signal arrives at the ADD input of buffer $Bm_{20}$ whose contents are then increased by one. For the store simulation module this signal at the same time ensures that the contents of the buffer module are reduced by one). When the line printer buffer $Bm_{20}$ is full (FULL output), the flipflop $FF_{20}$ is set, thus giving a request signal REQ for the channel $Cm_{20}$. The channel cycle starts, the cycle time being determined by the time $T_{20}$ which is required for printing one line. During this time, no store accesses are performed. This is achieved by the line $li_{20}$ which does not carry a 1-signal and which serves as a request-for-access line to the store simulation module. After the printing time has expired, the END output supplies a 1-signal which resets the flipflop $FF_{20}$, so that the procedure can be repeated again for as long as the store simulation module is not yet empty.

DISC STORE

A disc store is shown in FIG. 21. The disc store simulation is obtained by means of channel simulation modules and a counter-decoding module. Assume that there are 4 programmes on the disc store, each programme occupying a cylinder in that store. Consequently, there are required: 4 channel simulation modules $Cm_{211}$, $Cm_{212}$, $Cm_{213}$ and $Cm_{214}$ for simulating the searching of the 4 cylinders. The cylinder search times $T_{211} \ldots T_{214}$ are simulated by the channel cycle times. Also required is one channel simulation module $Cm_{215}$ for simulating the searching in a cylinder, the cycle time $T_{215}$ being one disc rotation period, one channel simulation module $Cm_{216}$ for simulating the reading (or writing), the cycle time $T_{216}$ being equal to one record length period, a counter-decoding module $CDm_{21}$, flipflops $FF_{211}$, $FF_{212}$, the AND-function gates 211 to 215 for control purposes, and an invertor $I_{211}$. The cyclic disc store is each time controlled by 1 of 16 positions: the outputs 1*a*, 1*b*, 2*a*, 2*b* . . . 8*a*, 8*b* of the counter decoding module $CDm_{21}$. Output 9*a* provides resetting via input RS. Positions 1*a* and 1*b* are used for searching the first cylinder. Position 2*a* serves for controlling the searching in the first cylinder, and position 2*b* serves for the read or write operation of the first programme in the first cylinder. The second, third and fourth programmes are controlled in the same manner by the positions 3*a*, . . . 4*b*; 5*a*, . . . 6*b*; 7*a*, . . . 8*b*. Cylinder searching: (described here for the first programme). When the counter decoder $CDm_{21}$ is in position 1*a*, a request REQ for the channel $Cm_{211}$ is made. The channel module $Cm_{211}$ starts and, by means of a 1-signal appearing on the output START, the counter decoding module $CDm_{21}$ is advanced one step (via the AND-function gate (in this case a NAND) 211): 1*b*. The signal 1*b* conditions (COND FREE of $Cm_{211}$) the output FREE of the channel $Cm_{211}$. Consequently, a 1-signal will appear on the FREE output each time, after a completed channel cycle. This cycle is determined by the clock pulse signal $CLOCK_{211}$, which is supplied from the channel, and which is equal to the cylinder search time $T_{211}$/32. If the output FREE receives a 1-signal, the counter-decoding module $CDm_{21}$ is advanced one step (in synchronism with the clock pulse signal CLOCK via the AND-function gate 211): 2*a*. The search operations for the other programmes are performed in the same manner. Since there are 4 channels, the cylinder search times may be different for each of the programmes.

SEARCHING IN THE CYLINDER this search is simulated for all programmes by means of a channel simulation module $Cm_{215}$, giving a delay which is uniformly divided between O and $T_{215}$, where $T_{215}$ is the disc rotation time. The channel operates continuously: REQ is alway 1 : REQ = 1. The output FREE of $Cm_{215}$ is conditioned by the COND FREE input. The COND FREE input carries a 1-signal, if a search command is given: hence a 2*a*, 4*a*, 6*a* or 8*a* signal from the counter-decoder $CDm_{21}$, in combination with other conditions not described, and originating from other parts of the simulation of a complete computer configuration. The complete situation is denoted in the FIG. 21 by SE (2*a*, 4*a*, 6*a*, 8*a*). As the channel is always in operation, the FREE output will carry a 1-signal at an arbitrary instant (uniformly divided) between O and $T_{215}$. This means that the search delay in a cylinder of the disc store is unfiromly divided between O and $T_{215}$, the disc rotation time. Using the 1-signal on the FREE output of $Cm_{215}$, the counter-decoding module $CDm_{21}$ is advanced one step (in synchronism with signal CLOCK via AND-function gate 211), i.e., to position 2*b*, 4*b*, 6*b* or 8*b*.

READING OR WRITING

Reading or writing is simulated for all programmes by means of a channel simulation module $Cm_{216}$ used as a multiplier. A flipflop $FF_{211}$ is set by means of the delayed (FREE output) signal from the preceding channel $Cm_{215}$. The output then carrying a 1-signal represents the write or read command: REQ for $Cm_{216}$. The channel cycle time $T_{216}$ is the time which is required for reading or writing one record length. During this time $T_{216}$, pulses are presented on the output OCCU which are conditioned by the COND OCCU input. This COND OCCU input of $Cm_{216}$ carries a clock pulse signal having a repetition frequency which is dependent on the disc rotation time, and the information density in the disc. The user is free to let the pulses on the OCCU output represent individual bits, or characters or even slow-store words; this can be determined by means of the COND OCCU input pulse frequency. The 1-signal on the END-output of $Cm_{216}$ reduces the number of record lengths still to be treated by one. As the REQ input can still carry a 1-signal, a subsequent record length will be directly read or written. When all record lengths have been read or written (a 1-signal on input EP, determined by programme control buffer simulation modules not shown, in conjunction with positions 2*b*, 4*b*, 6*b* and 8*b*), the flipflop $FF_{211}$ is reset, and the counter decoding module $CDm_{21}$ assumes a next position (via the AND-function gate 211 synchronized by the clock signal CLOCK): 1*a*, 3*a*, 5*a* or 7*a*. If no record lengths are to be read or written, i.e., a O-signal is present on input SE (2*a*, 4*a*, 6*a*, 8*a*), one of the AND-function gates 213 . . . 216 following an inverter $I_{211}$, will open and supply a set signal for the flipflop $FF_{212}$ each time that the $CDm_{21}$ module assumes a position 2a, 4a, 6a or 8a. The position of the flipflop $FF_{212}$ thus obtained, makes the $CDm_{21}$ module advance a number of steps via AND-function gate 211, until one of the positions 1a, 3a, 5a or 7a, is reached resetting the flip-flop $FF_{212}$. This means that the cylinders are searched one after the other.

SIMULATION OF A MOVE FACILITY

Each programme can make use of the facility for transferring part of the information from a slow store (slow-core type) to a main store or vice versa. The simulation thereof, requires only the simulation of the accesses of both stores. (See FIG. 22) See FIG. 22. Assuming that there are four programmes which have to be able to make use of the move facility, this requires priority modules (round-robin priority diagram) $Pm_{221}$ and $Pm_{222}$, each of which is combined with one channel simulation module $Cm_{221}$ and $Cm_{222}$, i.e., one combination for the slow store $SC_0$, (see hereinafter) and one combination for the main store MST, (see hereinafter). Each programme furthermore requires a buffer simulation module (in this case indicated only for one programme) $Bm_{22}$, and one flipflop (again for one programme) $FF_{22}$. The flipflop $FF_{22}$ is used for switching between an access in the main store, and an access in the slow store. If in a programme phase, information is moved from the slow store to the main store, an access is first made in the slow store. An access in the main store is made only after the former has been done. If the width of the data path of the main store differs from that of the slow store, this is denoted by the buffer $Bm_{22}$ which is used as a divider. For example, if 4 main store words are contained in one slow-store word, the buffer will divide by 4. In this case, a move from the slow to the main store results in one access in the slow store, followed by 4 accesses in the main store, followed by one access in the slow store, etc. If information is moved from the main store to the slow store in another programme phase, first, 4 accesses are made in the main store, and subsequently, 1 access is made in the slow store. The clock pulse period PP of the channel simulation modules used is determined by a desired period occurring, for example, in a peripheral processor (not shown). Only if the store requests ($li_{222}$ or $li_{224}$) are granted in one of the subsequent store submodules (see FIGS. 23 and 24), so that an empty-line $le_{221}$ or $le_{222}$ carries a 1-signal, and hence a FREE output of $Cm_{221}$ or of $Cm_{222}$ is conditioned and the channel cycle is completed, there will be a 1-signal on an output FREE. As a result of which the relevant priority module $Pm_{221}$ or $Pm_{222}$ receives a release signal via lines $li_{220}$ or $li'_{220}$: a request for access on line $li_{221}$ . . . (or $li_{223}$ . . . ) is granted, and in that case, a 1-signal appears on lines $lv_{221}$ and $lv_{222}$ (or $lv_{223}$ and $lv_{224}$) by means of which, the flipflop $FF_{22}$ is set, or is reset via the buffer $Bm_{22}$ after 4x a 1-signal on $lv_{223}$. The START output of channel $Cm_{221}$ is connected to the ADD input ($=li_{222}$) of the buffer in the slow store submodule (FIG. 23), thus providing a request at this location, when the channel cycle starts. The same applies to the START output of channel $Cm_{222}$, which is connected, via the line $li_{224}$, to the ADD-input of the buffer in the main store submodule (FIG. 24). The outputs of the flipflop $FF_{22}$, in conjunction with other signals in a simulation of a configuration, condition the requests for the store accesses: the request signals on lines $li_{221}$ and $li_{223}$ originate therefrom.

SLOW-STORE SIMULATION

FIG. 23 shows a slow-store simulation. This is in fact, nothing but a submodule (see FIGS. 17 and 18) $Sm_{23}$ having a clock pulse signal CLOCK of a period duration of the slow-store cycle time SCoc divided by $2^n$ (=32). The connecting lines may originate from, for example, a group of card readers, a move facility, a line printer or tape unit and a disc store. Consequently, all these modules have access to the slow store. A progressive priority may exist for the above-mentioned sequence of modules. $li_{23}$ is a line for requests from the group of card readers. If a store access is granted therefor, a 1-signal appears on the line $le_{23}$ to indicate that a card reader from the group can make a transport. $li_{222}$ is the line for requests in respect of the move facility (originating from FIG. 22). If this request for store access is granted, a 1-signal appears on the line $le_{221}$ indicating that the buffer for $li_{222}$ is empty (compare FIGS. 17 and 18) and that, consequently, a move can be effected. $li_{20}$ is the line for requests from the line printer or tape unit (see FIG. 20). The line printer or tape unit makes use of the signal on line $lv_{20}$ as an indication that an access is granted: compare, for example, the $lv_3$ line in FIG. 17.

To the disc store module (FIG. 21) it applies that a request signal from the disc store appears on the line $1_{21}$ = OCCU of channel module $Cm_{216}$. This has the highest priority: consequently, this disc-store module need not receive a signal back, as it cannot be stopped when requests are not dealt with in time.

MAIN STORE SIMULATION

The simulation of the main store can be effected in the same manner as the simulation of the slow store: making use of a submodule $Sm_{24}$ in FIG. 24. In this case, only 2 inputs are required for requests: $li_{25}$ originating from a central processor (see FIG. 25) and $li_{224}$ originating from the move facility (see the MS*t* outputs in FIG. 22). In this submodule $Sm_{24}$, a fixed priority exists, the move facility having the highest priority. The applied clock pulses CLOCK have a period which is equal to the main store cycle time MStc divided by $2^n$ (= 32). The signals indicating that a request from the central processor is granted appear on the lines $lv_{25}$ and $le_{25}$·$le_{222}$ serves the same purpose for the move facility. The END output of $Sm_{24}$ supplies a signal each time that the channel in the submodule has completed a cycle, so as to indicate that a requested store access cycle has been completed. This signal is applied to the central processor: END CP.

CENTRAL PROCESSOR SIMULATION

FIG. 25 shows a simulation for a central processor. The task of the central processor is to make store accesses in the main store MS*t* ($= Sm_{24}$, FIG. 24) at more or less arbitrary instants. The simulation can be effected by means of a channel simulation module $Cm_{25}$, a pulse randomizer module $Rm_{25}$, and a flipflop $FF_{25}$. A channel cycle starts when the REQ input receives a request-for-use signal. This is the case, if the central processor is allocated to a programme (via a priority module, for example). Furthermore, the input conditions have to be met for starting. These conditions are a signal on the line $le_{25}$ originating from the main store module, and the position of the flipflop $FF_{25}$, the inverse output $FF_{251}$ of which is connected to an INP-COND input of $Cm_{25}$. The channel clock pulse period CLOCK is equal to the period of the central processor $T_{25}$ divided by $2^n$ (= 32). (The latter will be equal again, for example, to the read-only store cycle). The START output of $Cm_{25}$ is connected to the CLOCK input of $Rm_{25}$. The output OUT of $Rm_{25}$ supplies the requests for access in the main store via line $li_{25}$. Each time that a 1-signal is supplied to the START output of $Cm_{25}$, the chance of occurrence of a request signal on the OUT output of $Rm_{25}$ is one-half. If a request has been made to the main store module, a O-signal will be present on line $le_{25}$ (not-empty condition of the buffer module in the $Sm_{24}$) by means of which a subsequent channel request on REQ is suppressed. If the request in the main store module is granted, $le_{24}$ carries a 1-signal again, but the line $lv_{25}$ then also carries a 1-signal (see, for example, FIG. 17 again), so that the flipflop $FF_{25}$ can be set therewith. The inverse output $FF_{251}$ then carries a O-signal, so that a subsequent channel request on REQ is still suppressed. A 1-signal on the END output of the main store module ($Sm_{24}$), indicating that the store access cycle has been completed, then ensures that the flipflop $FF_{25}$ is reset. The central processor can then make the next request for access in the main store (again via line $li_{25}$). This is again effected after the pulse from randomizer module $Rm_{25}$, at a chance occurence of one-half, each time within $T_{25}$ = central processor period, until that request has indeed been granted.

Each programme in a simulation has its own programme control counter decoding module, and a condition flipflop. The decoder indicates the consecutive programme phases. After the last phase, the counter is reset. The programme phase signals on the outputs of the counter decoding module are used for controlling the course of the programme, while, in conjunction with the conditions originating from programme control buffer simulation modules, the advancing to the next position of the counter decoder is governed. In this respect, see the example of the disc store described with reference to FIG. 21. The programme simulation may make use of a condition flipflop which is set in the last programme phase so as to read, in the case that the disc-store cylinder for that programme is full, the remaining information in the slow store, at least if this is possible.

It will be clear from the foregoing that the use of the described simulation modules, and the simulations which are possible therewith, enable the simulation of any arbitrary computer configuration.

Below an example is given of a simulation of a continuous flow model. This is a very simple example of a simulation. Simulations of much more complex configurations, however, can be realized in the same manner without the method of simulation itself deviating from the above-mentioned example.

A computer configuration can be represented in a simulation by a continuous flow model, the flows of information between the computer parts being invariant, viewed in time. In such a case the system can be described with the aid of a set of linear equations, where a solution can be found by means of linear programming. According to the present invention, such a system can also be simulated by means of the hardware simulator. In that case the following is to be taken into account: the flows have to be represented by pulses having a given repetition frequency. A continuous flow is a pulse series whose period, i.e., the time distance between successive pulses, is constant. In the simulation according to the invention, it is not possible to have only continuous flows in the above-mentioned sense. A continuous flow which is divided (in a buffer simulation module) produces a continuous output flow. However, a continuous flow which is multiplied in a channel simulation module does not produce a continuous output flow, except in the case that the input flow is maximum (determined by the channel limitation). The output flow, however, will be periodical, and will have a period which is equal to that of the input flow. In practice, however, the output flows supplied by the simulation modules will represent the reality of a computer configuration better than continuous flows. If a maximum average capacity is temporarily exceeded, this is signalled, while this is not so in the case of a continuous flow module. In the latter case, only averages occur. The contents of buffer or store simulation modules will vary in the hardware simulation like in reality, but this is not so in a continuous flow model.

If desired, the multiplication of a flow in a simulation can also be avoided, according to the invention, by using flows having a high frequency, and by dividing these instead of multiplying them.

FIG. 26 shows a computer configuration which is used as an example for the simulation of a continuous flow model. The configuration consists of a central processor CPU, and a peripheral processor PPU, both of which have access to a main store MStU via a switching unit SU. Two tape units $TU_1$ and $TU_2$, one card reader CRU, and a local store LMU, are connected to the peripheral processor PPU. The flows between the components are denoted by $f_1 \ldots f_7$. The directions thereof are not important in this context. The flows are expressed, for example, in characters per second.

Assume the flow equations to be:

$$f_1 = f_2 = 25 f_3 \; ; f_4 = 2(f_1 + f_2 + f_3) + f_5;$$

$$f_5 = 0.2\ (f_1 + f_2) + f_3 \; ; f_6 = 10 f_3 \text{ and } f_7 = f_5 + f_6.$$

Assume the flow limitations, determined by the equipment of the configuration to be simulated, to be:

$f_1 = f_2 = 10^5$ characters/second (tape units);

$f_3 = 2.10^3$ (card reader) ; $f_4 = 24 \cdot 10^6$ (computer background store) ;

$f_7 = 24 \cdot 10^6$ (computer main store).

FIG. 27 shows the simulation. Use is made of: channel simulation module $Cm_{271}$ as a multiplier, channel simulation module $Cm_{272}$ as a channel average limitation for the tape units and channel simulation module $Cm_{273}$ as a multiplier. Also present are a buffer simulation module $Bm_{27}$ which is used as a divider, and submodules (according to FIG. 18) $Sm_{271}, \ldots Sm_{275}$ which are used as pulse summation devices.

The simulation is then as follows: using the flow $f_3$ as a basis, the flows $f_1$ and $f_2$ are obtained in the channel simulation module $Cm_{271}$ by multiplication of $f_3$ (present on the REQ input $Cm_{271}$) by a factor 25, as $f_1 = f_2 = 25 f_3$. The channel cycle time $T_{271 \text{ of module } Cm_{271}}$ is determined by the maximum character frequency of flow $f_3$, i.e., $2.10^3$ characters/second or $T_{271} = 1/2.10^3$. The clock pulse frequency on the CLOCK input for module $Cm_{271}$ is then $1/2 \cdot 10^3 \cdot 32$ (compare description with reference to FIGS. 7 and 8). Hereinafter, the drawing always shows the reverse situation (i.e., the period time): $(1/\text{CLOCK} =) 32 \cdot 2 \cdot 10^3$. In order to obtain the multiplication × 25, a clock period or $25 \cdot 2 \cdot 10^3$ is to be applied to the COND OCCU input of $Cm_{271}$. At the OCCU output of $Cm_{271}$ the flow $f_1$ ($=f_2$) appears. This flow is applied directly to the REQ input of the channel simulation module $Cm_{272}$. In this module, $f_1$ and $f_2$ are subjected to a delay which is equal to the maximum average possibility of the information in, or from, the tape units, i.e., $10^5$ characters/second. In this case $T_{272} = 1/10^5$, so $1/CLOCK = 32.10^5$. The END output receives a signal after each cycle of $Cm_{272}$. This END output is connected to the request inputs $i_1$ and $i_2$ (since there are two flows $f_1$ and $f_2$) of a submodule $Sm_{271}$. The flow $f_3$ is present on the request input $i_4$. The channel module in $Sm_{271}$ receives a clock pulse signal having a period $32 \cdot 12 \cdot 10^6$, i.e., the cycle time is $12 \cdot 10^6$ in this case. This can be chosen in veiw of the minimum time which is to expire between the output pulses and which is determined by the maximum storage capacity of $24 \cdot 10^6$. The difference, by a factor 2 ($12 \cdot 10^6$), is due to the fact that, according to the formula given for $f_4$, the result $(f_1 + f_2 + f_3)$ is still to be multiplied by a factor 2. For this purpose, the channel module in $Sm_{271}$ carries a pulse signal having a period $2 \cdot 12 \cdot 10^6$ on its COND OCCU input, so the sum flow $2.(f_1 + f_2 + f_3)$ appears on the OCCU output of the submodule $Sm_{271}$. The END of the channel simulation module $Cm_{272}$ is connected to the request inputs $i_1$ and $i_3$ (for the flows $f_1$ and $f_2$, respectively) of the submodule $Sm_{272}$. In this submodule the flows $f_1$ and $f_2$ are added to form $f_1 + f_2$. The clock pulse signals for $Sm_{272}$, and the subsequent submodules $Sm_{273}$ . . . $Sm_{275}$, all have a period of $32 \cdot 24 \cdot 10^6$ which is chosen to be equal to 32× the store average capacity of $24 \cdot 10^6$ characters per second. The END output of $Sm_{272}$ is connected to the CLOCK input of the buffer simulation module $Bm_{27}$. The capacity of the buffer is 4, which means that the division by a factor 5 is effected in the manner described with reference to the FIGS. 10 and 11. The FULL output then supplies the flow $(1/5)(f_1 + f_2)$. This $0.2(f_1 + f_2)$ flow arrives at the request input $i_3$ of the next submodule $Sm_{273}$. The flow $f_3$ is present on the input $i_1$ of this submodule. After summation, the flow $0.2(f_1 + f_2) + f_3 = f_5$ appears on the END output of $Sm_{273}$. Via the request inputs $i_1$ and $i_3$ of the submodule $Sm_{274}$, the flows $2(f_1 + f_2 + f_3)$ and $f_5$, respectively, are applied to this submodule $Sm_{274}$. Summation results in the flow $f_4 = 2(f_1 + f_2 + f_3) + f_5$, as a measure of the occupation of the local store LMU (FIG. 26). Furthermore, the flow $f_3$ is also applied to the channel simulation module $Cm_{273}$ in which this flow is multiplied by a factor of 10 to form $f_6 = 10f_3$. $T_{273}$ is again equal to $1/2.10^3$ (as in $Cm_{271}$), so $1/CLOCK = 32 \cdot 2 \cdot 10^3$. Consequently, in view of the multiplication by 10, the period on the COND OCCU input of $Cm_{273}$ is $10 \cdot 2 \cdot 10^3$. The OCCU output of $Cm_{273}$ is connected to the request input $i_3$ of the submodule $Sm_{275}$. Request input $i_1$ receives the flow $f_5$, so that the summation in this submodule $Sm_{275}$ produces the flow $f_7 = f_5 + f_6$ on the output END, as a measure of the occupation of the main store MS$t$U (FIG. 26). By this method of simulation it is observed that it is easy "to play" with the simulated configuration. The flow $f_3$ can be varied by choosing other clock pulse periods. The simulation module occupation percentages can be measured, so that the results are known. It is also possible to vary the average limitations of simulation modules by varying the clock pulse periods, after which the effect of those variations on the simulated system can be established. If information jams occur in the system, they are indicated by alarm signals. The coefficients of the equations can also be varied by varying the clock pulse period. If the flow equations themselves, the number of flows, or the entire configuration are changed, it is obvious that it is also necessary to change the simulation thereof by means of the simulation modules.

What is claimed is:

1. A method of digital simulation of digital computer configurations, comprising the steps of:

a. replacing various computer modules of a digital computer configuration with hardware digital simulation modules which perform similar functions of said computer modules;

b. introducing during a presetting phase prior to a simulation run, starting conditions in designated simulation modules;

c. conducting said simulation run, and simulating actual speeds of the computer modules by applying clock pulses to said simulated modules during said simulation run; and d. displaying upon display modules events taking place in the simulated modules during said simulation run, whereby said displayed events are indicative of actual events taking place for said digital computer configuration.

2. A digital simulator for simulating digital computer configurations, comprising:

a panel for receiving hardware digital simulation modules;

hardware digital simulation modules for placement upon said panel, said simulation modules simulative of various actual computer modules in an actual computer configuration;

means for connecting said simulation modules in accordance with said computer configuration to be simulated;

power supply means connected to said panel for supplying power to said simulative modules;

presetting means operative upon said simulator for presetting starting conditions in designated simulation modules;

clock means connected to said simulative modules for adjusting the speed for the simulation modules to be simulative of said actual computer modules of said computer configuration to be simulated; and display means connected to said simulative modules for signaling conditions of the simulation modules during a simulation run, whereby said conditions taking place for said simulation computer modules under said simulation run are indicative of conditions of the actual computer configuration.

* * * * *